United States Patent [19]

Adlon et al.

[11] Patent Number: 4,584,757

[45] Date of Patent: Apr. 29, 1986

[54] ASSEMBLY FOR CONNECTING ELECTRICAL CONNECTORS TO FLAT MULTICONDUCTOR CABLE

[75] Inventors: Daniel T. Adlon, Swatara; Edward A. Bianchi, Hummelstown; Neil F. College, Elizabethtown; George D. Reuss, Harrisburg, all of Pa.

[73] Assignee: AMP Incorporated, Harrisburg, Pa.

[21] Appl. No.: 704,834

[22] Filed: Feb. 25, 1985

[51] Int. Cl.⁴ ........................ B23P 23/00; H01R 43/00

[52] U.S. Cl. .................................. 29/564.6; 29/566.3; 29/753

[58] Field of Search ................ 29/33 M, 564.1, 564.4, 29/564.6, 564.8, 564.3, 566.4, 564.2, 747, 748, 749, 753, 757, 783, 795, 857, 861, 863; 901/41, 8

[56] References Cited

U.S. PATENT DOCUMENTS

| | | | |
|---|---|---|---|
| 4,110,880 | 9/1978 | Peppler | 29/749 |
| 4,148,130 | 4/1979 | Stauffer | 29/566.3 |
| 4,281,442 | 8/1981 | Senior et al. | 29/33 M |
| 4,344,225 | 8/1982 | Johnson, Jr. et al. | 29/857 |
| 4,351,110 | 9/1982 | Folk | 29/753 X |
| 4,419,817 | 12/1983 | Funcik et al. | 29/857 X |
| 4,527,328 | 7/1985 | Moody et al. | 29/749 |

FOREIGN PATENT DOCUMENTS

| | | | |
|---|---|---|---|
| 22637 | 1/1981 | European Pat. Off. | 29/749 |
| 46076 | 2/1982 | European Pat. Off. | 29/749 |
| 1374849 | 11/1974 | United Kingdom | 29/747 |

*Primary Examiner*—William R. Briggs

*Attorney, Agent, or Firm*—Thomas G. Terrell

[57] ABSTRACT

In an assembly for connecting electrical connectors to flat multi-conductor cable, an arm of a robot is provided with a connector transfer nest into which a connector can be fed at a connector feed station, for transfer by the robot to a press through which the cable has been fed. The nest is inserted into the press by the robot so that the cable extends through the nest and the press is then operated to actuate means in the nest to force conductor receiving portions of terminals in the connector through the cable to receive the cable conductors. The robot is then operated to withdraw the nest from the press leaving the connector on the cable and the cable is fed forward to allow the robot to apply a further connector thereto and so on. Means may be provided for severing the cable with the connectors thereon to provide separate electrical harnesses.

20 Claims, 51 Drawing Figures

341
294
305
309
307
13D
238
341
339
296
335
337
86
298
333
219
88
13C
26
219
13C
13B
252
224
216
218b
224
218b
200
198
218a
208
216
218a
204
222
13B
219
222
210
219
196
84
244
230
232
194
250
234
341
347
339
246
347
333

ASSEMBLY FOR CONNECTING ELECTRICAL CONNECTORS TO FLAT MULTICONDUCTOR CABLE

This invention relates an assembly for connecting to the conductors of a flat, multiconductor cable, electrical connectors having electrical terminals, provided with cable conductor-receiving portions, and especially concerns such apparatus for producing electrical harnesses each comprising a plurality of such connectors.

Although such assemblies have been described, for example in U.S. Pat. No. 4,285,118 and U.S. Pat. No. 4,148,130, these assemblies are intended for securing the connectors to the cable in the same orientation relative thereto, that is to say, with the connectors all projecting from the same side of the cable. However, it is sometimes required that some of the connectors should project from one side of the cable and some from the other, that is to say, in opposite vertical orientations with respect to the plane of the cable, and sometimes, also, that the end-wise orientations of the connectors should also differ.

The present invention is intended to provide an assembly that is capable of meeting such requirements, and also of securing to the cable, connectors of different kinds.

The invention proceeds from appreciation that with the aid of suitable associated tooling, a conventional robot can be employed as a means for transferring connectors from a supply thereof to selected positions on the cable, with the required orientations. Apart from the satisfaction of most conceivable customer demands in the context concerned, an advantage of employing a robot in this way is that, should the associated tooling eventually no longer be required, the robot can be used for other purposes, so that redundancy of equipment is reduced to a minimum.

In accordance with the invention, the arm of the robot is provided with a connector transfer nest into which an electrical connector can be fed at a connector feed station for transfer by the robot to a press through which the cable has been fed. The nest is inserted into the press by the robot so that the cable extends through the nest, and the press is then operated to actuate means in the nest to force the conductor-receiving portions of terminals in the connector through the cable so that the conductors thereof are received in these portions, after which the robot is operated to withdraw the nest from the press leaving the connector mechanically and electrically connected to the cable. The cable is then fed forward to allow the robot to apply a further connector to the cable, and so on. The cable can then be severed, preferably at a cable gripping and cutting station of the assembly, when a desired number of connectors have been connected thereto.

In order to provide that the connectors are secured to the cable in different vertical orientations, the nest can be attached to the robot arm in such a way that the robot can rotate the nest in order to select the vertical position of a connector therein. In order to vary the end-wise orientations of the connectors, the press can be so constructed that the robot can insert the nest thereinto from two opposite sides of the press. The nest may be arranged to have fed thereinto, at the pickup station, a connector body and a cover therefor which is latchingly matable with the body so as to drive the cable conductors into the conductor-receiving portions of the terminals. When the nest is received in the press, the cable extends between the body and the cover therein, so that when the press is operated, means in the nest force the cover and the body into mating relationship whereafter the press is operated to release the connector from the nest and the nest is transferred by the robot back to the pickup station.

If desired, a plurality of connector pickup stations, each for a different form of connector, may be arranged along the work envelope of the robot, a different nest being provided at each pickup station. In this case, means are provided for releasably attaching the robot arm to any one of the nests so that the robot can pick up a first nest from a first pickup station, transfer it to the press, return it to the first pickup station, detach the arm from the first nest, and then move the arm to a second pickup station to transfer a second nest thereat to the press, and so on.

The nest or nests may be provided with terminal busing means for cooperation with a device for detecting discontinuity between a terminal of a connector applied to the cable and the corresponding conductor of the cable or the presence of a short circuit between the cable conductors or the terminals and means may also be provided for discarding a harness comprising a faulty termination, where such discontinuity or a short circuit is detected.

The cable gripping and cutting station may comprise a cable gripping unit provided with grippers having an open position to allow the cable with one or more connectors thereon to be fed through the gripping unit and a closed position for gripping the cable so fed, a cable cutting unit thereafter being moved into the cable gripping unit to sever the cable or to cut out a slug thereof from between two connectors applied thereto. Two cable cutting units movable alternatively into the gripper unit may be provided to carry out the severing operations in respect of different relative orientations of the connectors.

For insuring that the cable is fed through the press and the cable gripping unit to accurate length, and to insure that the cable is undamaged by the feeding operation, there may be provided for feeding the cable, a feed mechanism having idle rolls about which extends an endless belt of a soft resilient material, the idle rolls being urged towards a driven roll thereby to force a cable extending between the driven roll and the belt, against the belt.

For a better understanding of the invention and to show how it may be carried into effect, reference will now be made by way of example to the accompanying drawings in which.

Figure 1:
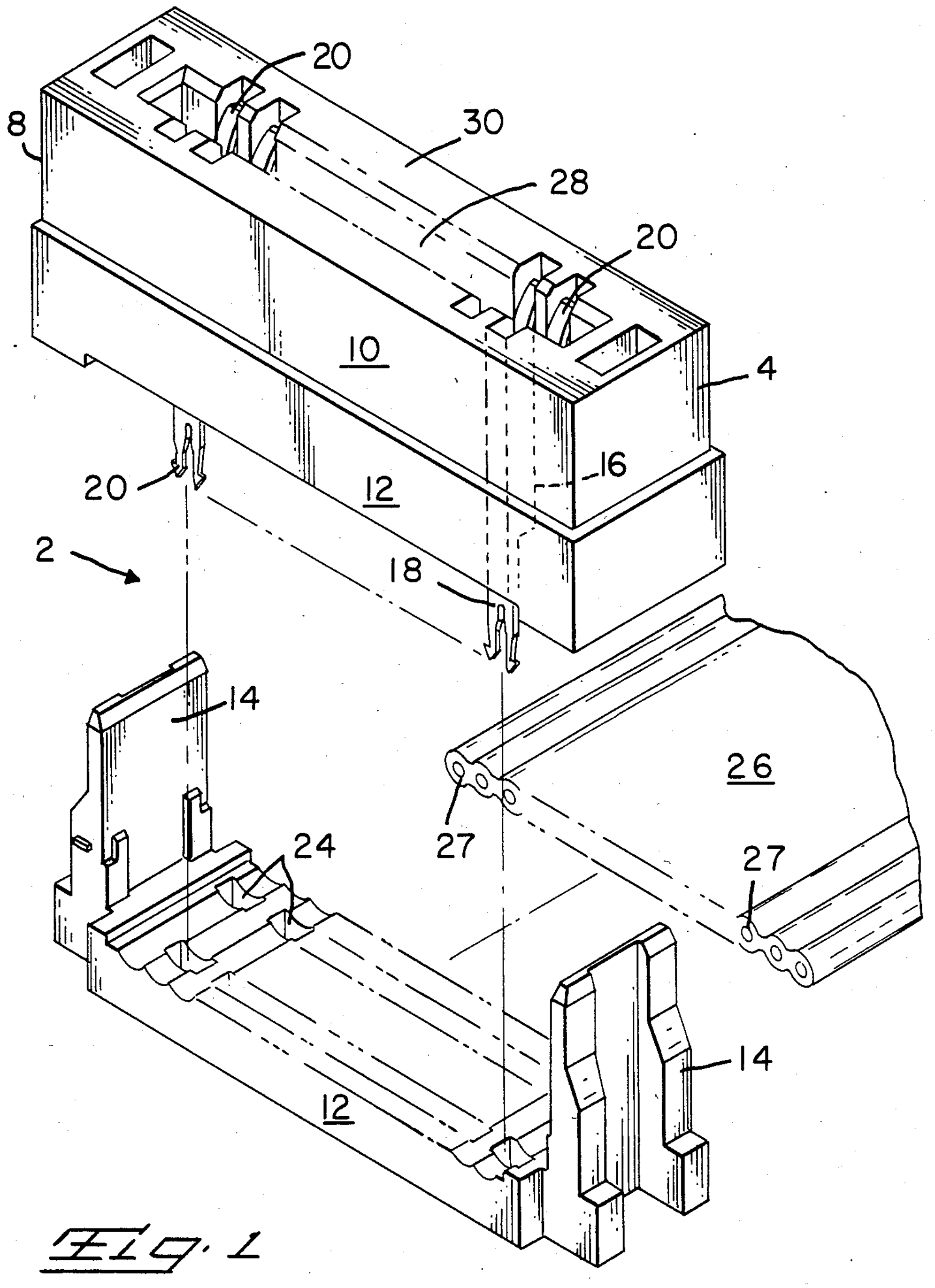
FIG. 1 is a perspective view of an electrical connector in association with a ribbon cable to be terminated by means of the connector.

As shown in FIG. 1, an electrical connector 2 comprises an insulating connector body 10 having a first end 4 and a second end 8, and a cover 12 which can be secured to the body 10 by means of latch arms 14 on the cover 12. The body 10 is formed with rows of cavities 16 each accommodating an electrical terminal 18 having a contact spring portion 20 and a forked, wire connecting portion 22. The cover 12 is formed with cavities 24 each for receiving one of the portions 20 of the terminals 18. If a ribbon cable 26 is positioned between the body 10 and the cover 12 as shown and the cover 12 is then driven towards the body 10 to engage the arms 14 therewith, each forked portion 22 will be forced through the insulation of the cable 26 to receive a respective conductor 27 of the cable 26 so as to make electrical contact therewith, the cable 26 being sandwiched between the body 10 and the cover 12, and the body 10 and the cover 12 being firmly secured together by virtue of the latch arms 14 and by means of barbs on the forked portions 20 which engage the walls of the cavities 24 of the cover 12 according to the teaching of U.S. Pat. No. 3,820,055 which is incorporated herein by reference. Each of the cavities 16 opens into a board channel 28 in the body 10, which channel in turn opens into a mating face 30 of said body. A circuit board (not shown) can be inserted into the channel 28 so that each contact spring 20 engages a conductor on the board, whereby the terminals 18 are electrically connected to the conductors 27 of the cable 26.

Figure 4A:
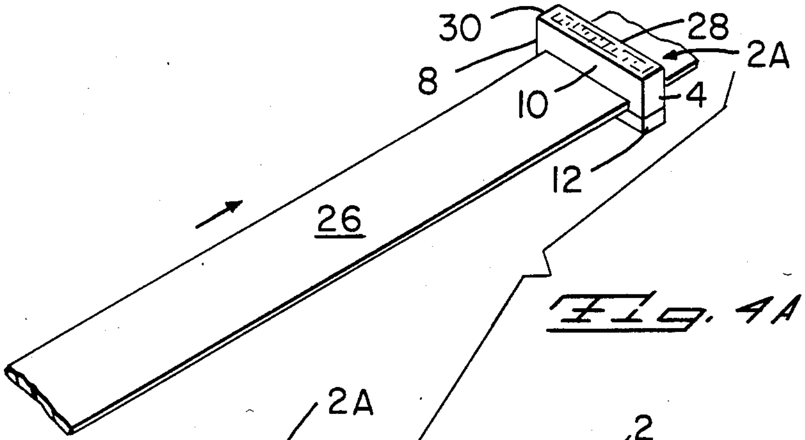
FIGS. 4A to 4F are perspective views illustrating successive steps in the production of one example of an electrical harness, by means of the assembly.
Figure 4B:
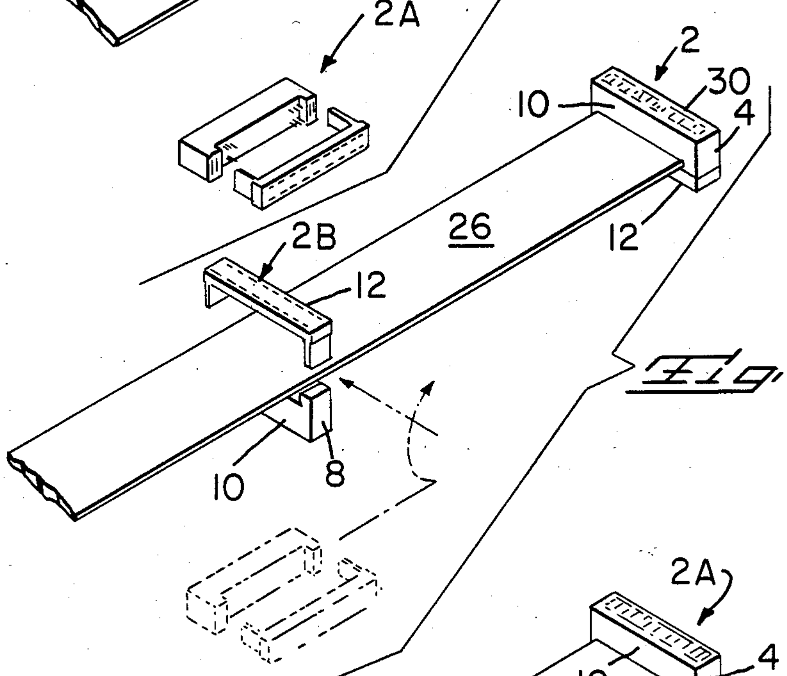
Figure 4C:
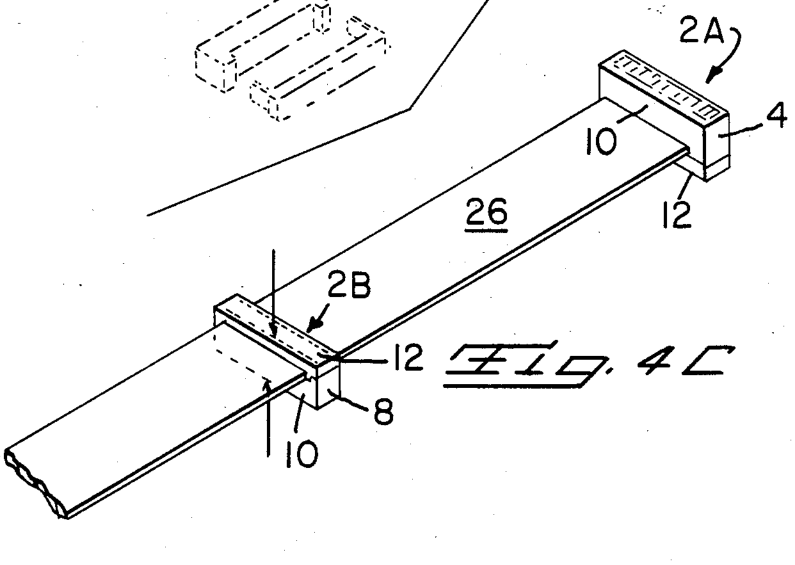
Figure 4D:
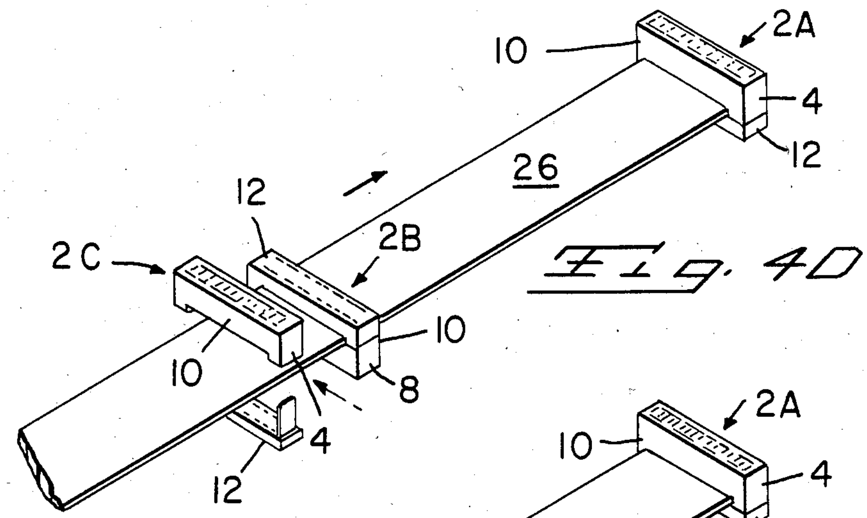
Figure 4E:
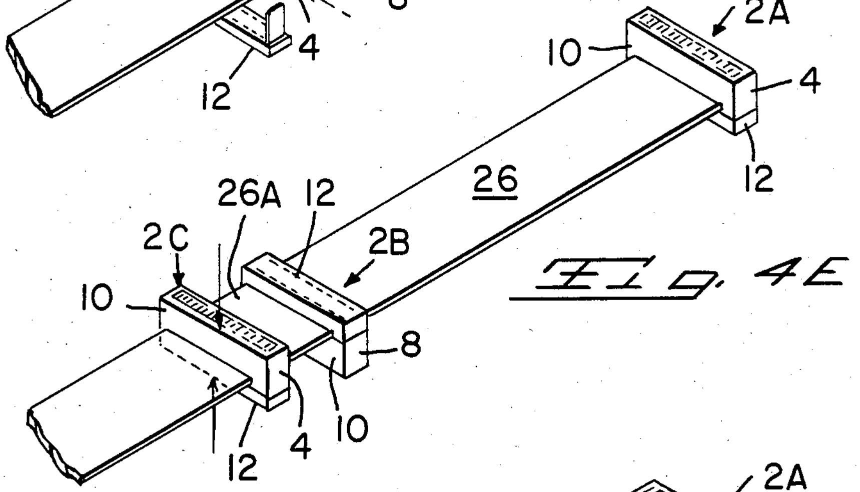
Figure 4F:
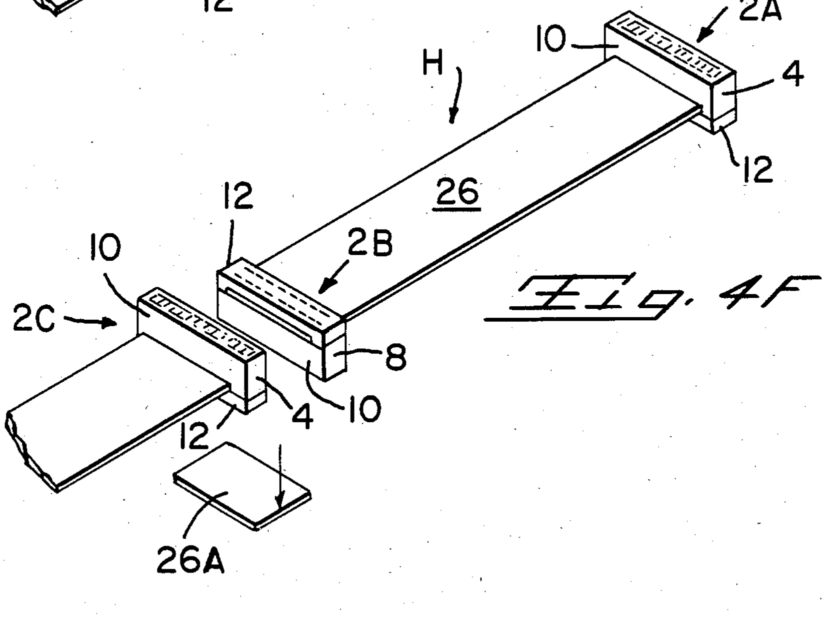

The harness making assembly to be described herein is intended, according to an exemplary mode of use, to perform operations which are illustrated diagrammatically in FIGS. 4A to 4F. That is to say as shown in FIG. 4A, initially to secure a first connector 2A to an end of the cable 26 with its cover 12 down and its body end 4 facing the reader, then as shown in FIGS. 4B and 4C to secure a second connector 2B to the cable 26 at a position spaced from the connector 2A by a desired lead length with the cover 12 of the connector 2B up and its body end 8 facing the reader, subsequently, as shown in FIGS. 4D and 4E to secure a third connector 2C to the cable 26 proximate to the connector 2B with the cover 12 of the connector 2C down and its body end 4 facing the reader, and finally to slug out the portion 26A of the cable 26, which remains between the connectors 2B and 2C, as shown in FIG. 4F, the section of cable 26 with the connectors 2A and 2B secured to its respective ends thereby constituting a separate and complete electrical harness H. The connector 2C, of course, is to be the first connector of a second harness produced in the same way as the first, and so on. The apparatus to be described is capable of securing connectors 2 to the cable 26 in any one of the four orientations described above, that is to say with the cover 12 up, with the cover 12 down, with the body end 4 facing the reader, and with the body end 8 facing the reader, respectively, and in any desired combination.

The harness making assembly will now be described in outline with reference to FIGS. 1A, 2 and 3. The assembly comprises a conventional robot 34 mounted beside a work table 36 carrying a connector pick up station 38, a cable feed station 40, a press 42, a cable gripping and cutting station 44, and a harness ejecting station 46.

The robot 34 comprises a body 48 mounted on a base 49, for rotation about the axis of a vertical shaft 50, the body 48 having mounted thereto on a vertical shaft 51, for swinging movement also about a vertical axis, an arm 52 having an upper arm portion 54 to which is pivoted a fore arm portion 56 for swinging movement about a vertical shaft 58, and having at its distal end a vertical tool carrier arm 60 which is rotatable about, and extensible along, a vertical axis.

The feed station 38 comprises a connector feed table 62 supporting a vertical, gravity feed, connector magazine 64 containing a supply of connector bodies and covers stacked and separately contained, therein. A connector feed ram 66 on the table 2 is arranged simultaneously to feed one connector body 10 and one cover 12, at a time from the base of the magazine 64, in a leftward (as seen in FIG. 1A) direction.

The cable feed station 40 comprises a cable reel 68 on which is a supply of the cable 26, a cable dereeler 70, a cable loop cage 72, a continuity tester 74 and a cable feed mechanism 76. The tester 74 is secured to the shaft 77 of the reel 68 and is connected to the inner end of the cable 26 thereon through slip rings 79.

The press 42 comprises platens 78 and 80 which are arranged to be driven towards and away from one another by means of a drive piston and cylinder unit 82.

The cable severing station comprises two cable cutter units 84 and 86, respectively, each of which is slidable into a cable gripping unit 88.

The harness ejection station 46 comprises a belt conveyor 90 driven by a motor 91 and extending from the unit 88. At the distal end of the conveyor 90 is a flip chute 92 which is pivotable in either sense about a horizontal axis as indicated by the arrow A in FIG. 1A, by means of a rotary actuator 93.

A flat, connector transfer, nest 94 is attached to a robotic hand on the arm 60 of the robot 34, for rotary movement about a horizontal axis.

A control cabinet 98 contains a control system comprising a programmable logic controller and optionally the robot controller. The control system monitors and commands all tooling in the work space, excepting the robot controller, which is dedicated to the robot. The latter monitors and commands all robot movements, issues tooling commands to the programmable logic controller for execution and stores the main system program. The continuity tester 74 is connected to the control system via the slip rings 79.

The consecutive steps in the operation of the assembly will now be described in outline with reference to FIGS. 1A and 4A to 4F. The robot 34 is operated to position the nest 94 on the left hand end of the feed table 62 (as shown in FIG. 1A); the ram 66 is operated to insert the body 10 and the cover 12, of the connector 2A, from the base of the magazine 64 into the nest 94 so that the cover 12 and the body 10 are retained therein in spaced relationship; the robot 34 is operated to withdraw the nest 94 from the table 62, to rotate the nest 94 so that it lies in a vertical plane with the body 10 therein uppermost; the cable 26 is fed by the cable feed mechanism 76, between the open platens 78 and 80 of the press 42 and through the unit 88; the robot 34 is operated to insert the nest 94, while still in said vertical plane, into the press 42 and between the platens 78 and 80, from the right hand (as seen in FIG. 1A) side of the press 42, so that the cable 26, which extends therethrough, is received in slots 95 in the nest 94 so as to extend between the body 10 and cover 12 in nest 94; the drive unit 82 is actuated to close the platens 78 and 80 about the nest 94 and thereby to cause spring loaded plungers therein to force the cover 12 and the body 10 into mated relationship so that the contacts 18 of the body 10 are connected to the cable conductors and the cable is sandwiched between the cover 12 and the body 10; a bussing plate in the nest 94 simultaneously enters the board channel 28 of the body 10 to engage the contact springs 20; the unit 82 is actuated to open the platens 78 and 80 to release said plungers; the robot 34 is operated to withdraw the nest 94 from the press 42 whereby the connector 2A which has now been secured to the cable 26 remains within the press 42; the cable 26 is advanced again so that the connector 2A is moved into the unit 88; the cutter unit 86 is moved into the unit 88 causing the latter to grip the cable 26 on either side of the connector 2A and the unit 86 is actuated to sever the cable 26 downstream of the connector 2A; the robot 34 is operated to return the nest 94 to the table 62 and the ram 66 is operated to insert the body 10 and cover 12 of the next following connector, that is to say the connector 2B, from the magazine 64 into the nest 94; the robot 34 is operated to withdraw the nest 94 from the table 62 and to rotate the nest 94 through 90° from its horizontal position, into a vertical plane, but in this case with the cover 12 of the connector, instead of the body 10, uppermost; the robot 34 is operated to insert the nest 94 into the press 42 from its left hand (as seen in FIG. 1A) side and between the open platens 78 and 80, the cable 26 having been advanced by the mechanism 76 by the desired distance between the connectors 2A and 2B; the drive unit 82 of the press 42 is actuated to cause the connector 2B to be secured to the cable 26, the bussing plate to enter the board channel 28 of the connector 2B and to cause the nest 94 to release the connector 2B; the robot 34 is operated to remove the nest 94 from the press 42 and to return it to the table 62; and the cable 26 is advanced by the length of the slug portion 26A; the ram 66 is actuated to cause the body 10 and cover 12 of the connector 2C to be inserted from the base of the magazine 64 into the nest 94; the robot is operated to rotate the nest 94 into a vertical plane, with the body 10 uppermost, and to insert the nest 94 through the right hand side (as seen in FIG. 1A) of the press 42; the unit 82 is actuated to close the platens 78 and 80 to mate the body 10 and cover 12 so that the connector 2C is secured to the cable 26 and to cause the continuity test to be carried out; the cable 26 is advanced by the mechanism 76 to insert the connector 2B and 2C into the cable gripping unit 88; the cable cutting unit 84 is slid into the unit 88; the unit 88 is operated to clamp the cable securely on either side of the connectors 2B and 2C and to cause the cutting unit 84 to slug out the portion 26A of the cable 26 between the connectors 2B and 2C, whereby the harness H comprising the connectors 2A and 2B, falls onto the conveyor 90 so as to be carried into the flip chute 92.

Figure 1A:
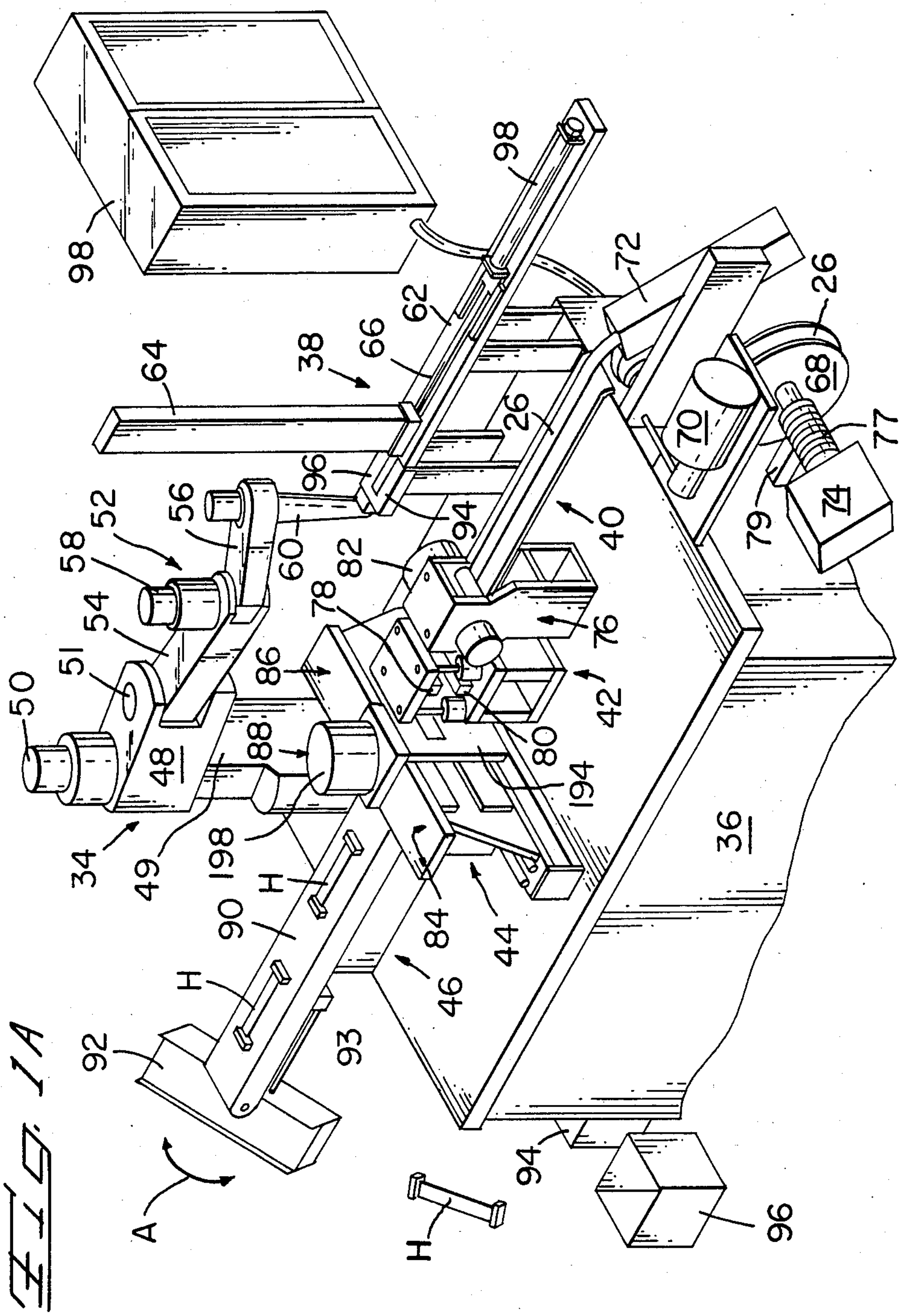
FIG. 1A is a diagrammatic perspective view of an assembly for the production of electrical harnesses comprising electrical connectors according to FIG. 1 mechanically and electrically connected to lengths of the ribbon cable.

If the continuity tester 74 has found lack of continuity between any terminal of the connectors 2A and 2B and the corresponding conductor of the cable 26, or short circuiting between the terminals or the conductors the tester 74 signals the control system to operate the actuator 93 to rotate the flip chute 92 in a clockwise (as seen in FIG. 1A) sense so that the defective harness H falls into a waste box 94. Otherwise, the flip chute 92 remains in the angular position in which it is shown in FIG. 1A and the harness H, the continuity of which has been successfully tested, falls into a harness box 96.

The programmable logic controller can be programmed to produce leads other than those described above. For example, each lead could have an identically oriented connector at each end, or both connectors could have their covers facing in the same direction, but with their body ends 4 facing in opposite directions.

Also, intermediate connectors can be secured to the cable to produce a "daisy chain" harness.

The lead making assembly, with the exception of the robot 34, which as mentioned above is conventional, will now be described in greater detail.

Figure 7:
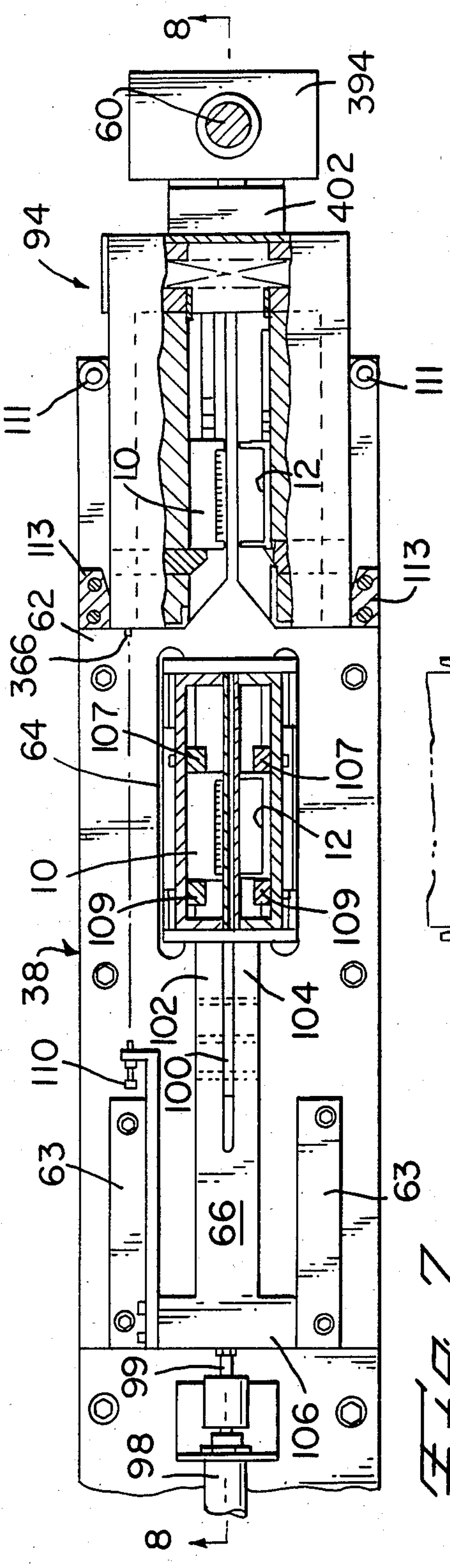
FIG. 7 is a plan view of a connector pick-up station of the assembly.
Figure 8:
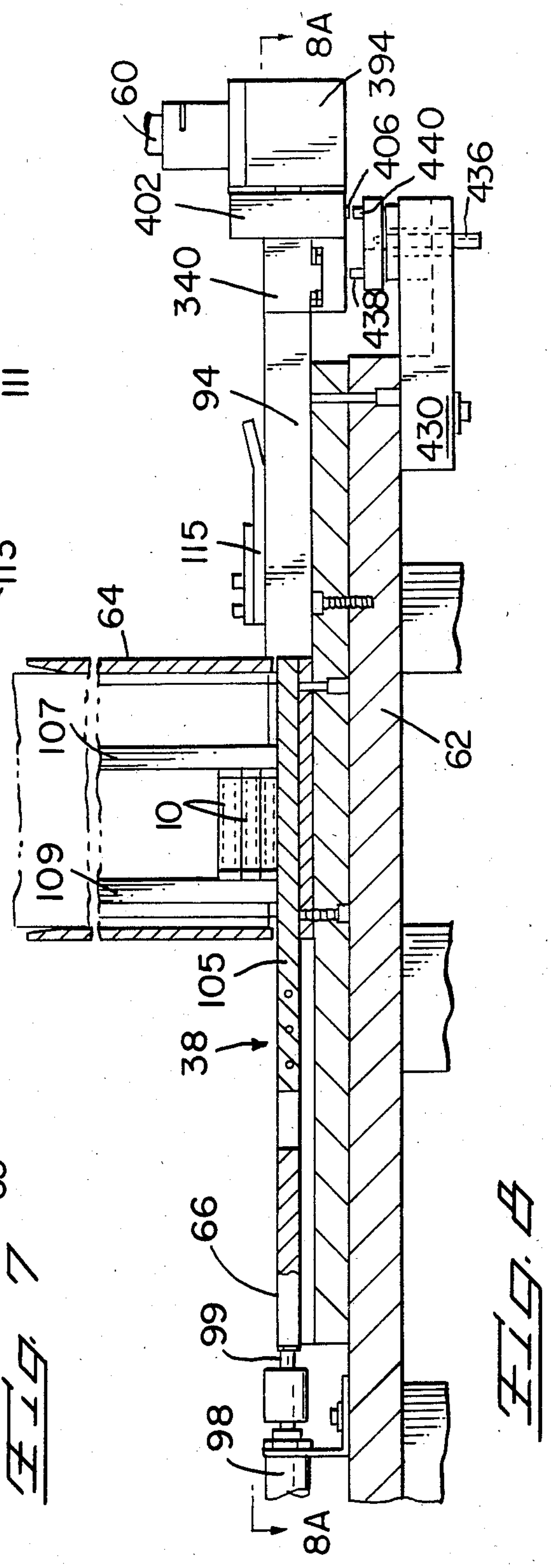
FIG. 8 is a view taken on the lines 8—8 of FIG. 7.
Figure 8A:
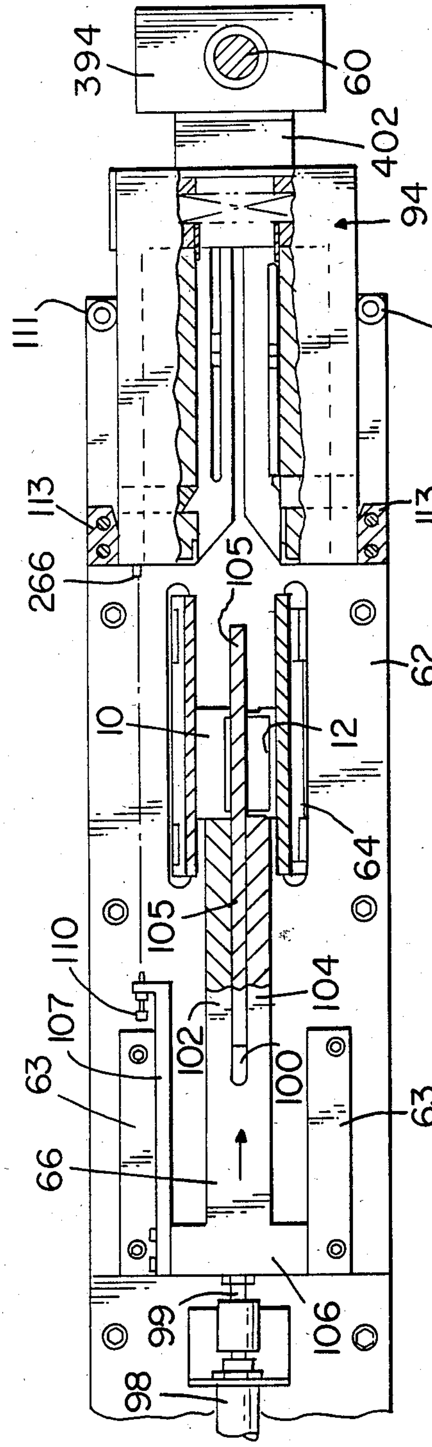
FIG. 8A is a view taken on the lines 8A—8A of FIG. 8.
Figure 13D:
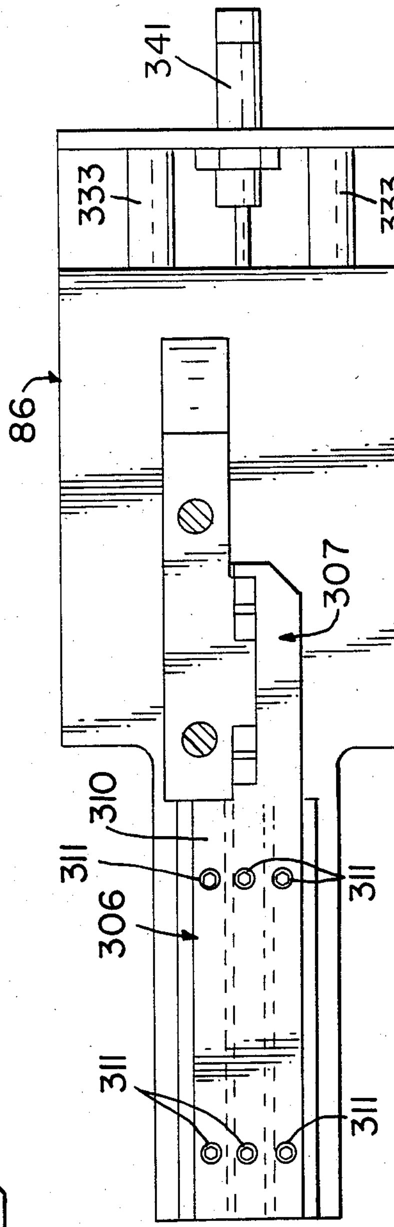
FIG. 13D is a view taken on the lines 13D—13D of FIG. 13A.

As best seen in FIGS. 7, 8 and 8A, the connector feed ram 66 is arranged to be driven in reciprocating motion along the table 62, guided by guide plates 63, by means of a piston and a cylinder unit 98 having a piston rod 99. The ram 66, has a central slot 100 defining parallel arms 102 and 104 between which is secured a separator blade 105, projecting beyond the distal ends of the arms 102 and 104. At its left hand (as seen in FIGS. 7 and 8A) end, the ram 66 has a cross piece 106 to one end of which is connected a stop arm 108 provided with an axially adjustable latch release screw 110 and its distal end. In the retracted position of the rod 99, the arms 102 and 104 project slightly into the base of the magazine 64, as shown in FIGS. 7, 8 and 8A; the arm 102 being positioned to drive the lower most body 10 of a stack of bodies 10 in the magazine 64 and the arm 104 being positioned to drive the lowermost cover 12 of a stack thereof in the magazine 64, the blade 105 extending between the lowermost body 10 and cover 12. The stacks of bodies 10 and covers 12 are confined between guide walls 107 and 109, the former being adjustable in a direction towards and away from the latter so that the magazine 64 can accommodate bodies and covers for connectors of different lengths. The walls 107 and 109 terminate above the table 62 to allow the arms 102 and 104 and the blade 105 to be passed through the magazine. On the side of the magazine 64 remote from the unit 98, the table 62 is provided with guide rolls 111, guide blocks 113 and a guide plate 115 for guiding the nest 94 onto the table 62, and for restraining it against lateral and vertical movement. The piston rod 99 can be advanced to cause the arms 102 and 104 to drive the lowermost body 10 and the lowermost cover 12, respectively, into the nest 94 when it is on the table 62. When the piston rod 99 is subsequently retracted the next following body 10 and cover 12 of each stack drop into a position to be driven by the arms 102 and 104, respectively. Fixed beneath the end of the table 62, at its end remote from the unit 98 is a nest retainer unit 430 which is described in detail below.

Figure 5:
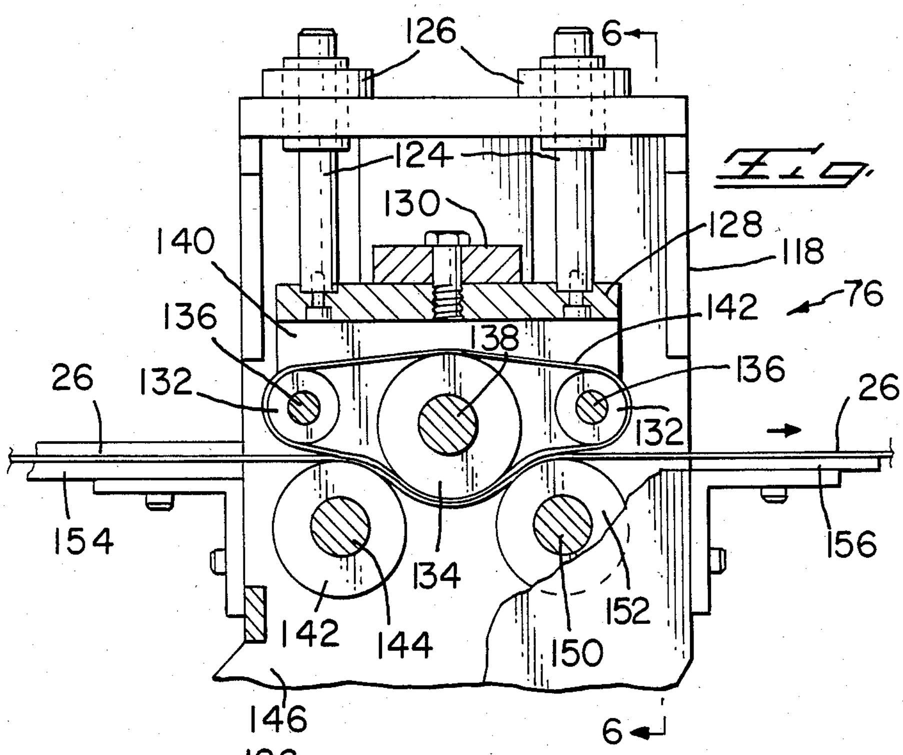
FIG. 5 is a side view, taken on the lines 5—5 of FIG. 2.
Figure 6:
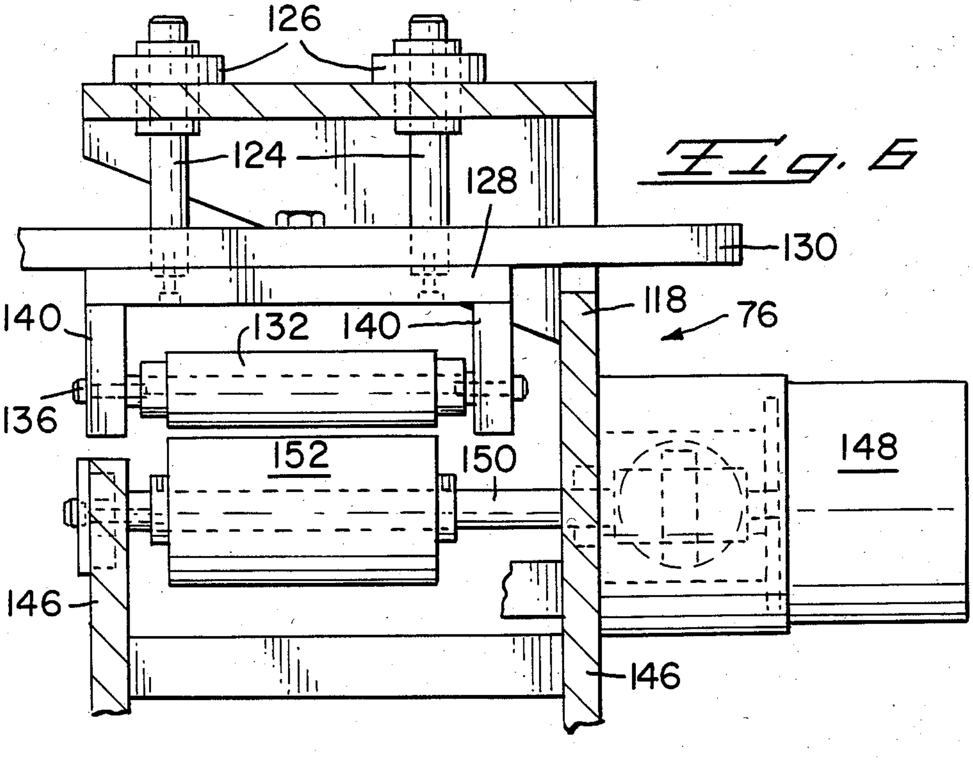
FIG. 6 is a view taken on the lines 6—6 of FIG. 5.

As shown in FIGS. 5 and 6, the cable feed mechanism 76 comprises a housing 118 in the top wall 122 of which are mounted parallel rods 124 which are slidable in bearings 126 and which support a clevis 128 carrying a preloading bar 130. Smaller diameter idle rolls 132 and, between them, a larger diameter idle roll 134 are mounted on shafts 136 and 138, respectively, journaled in the arms 140 of the clevis 128. An endless belt 142 (not shown in FIG. 6) extends about the rolls 132 and 134. The belt 142 is preferably made of a flexible but inextensible material, for example, a thin, fabric reinforced rubber material, so that low running friction is achieved. Beneath, as seen in FIGS. 5 and 6, the idle rolls is a further idle roll 142 mounted on a shaft 144 journaled in the side walls 146. A stepping motor 148 secured to the housing 118 drives a shaft 150 journaled in the walls 146 and to which is fixed a drive roll 152. The rolls 142 and 152 are of the same diameter and engage the cable 26 each at a position between the roll 134 and the adjacent roll 132, whereby the cable 26 cannot be nipped between rolls. The belt 142 engages the cable 26 with a firm and even pressure, being urged there against by the weight of the bar 130. As the pressure is evenly distributed across the cable 26, as the cable is not nipped between the rolls, and as the belt 142 is of a thin flexible material, distortion of the cable 26, when it is being fed, is avoided whereby accurate feeding of the cable 26 is ensured.

The cable 26 is fed from the loop cage 72, to the feed mechanism 76, by way of a guide channel 154 and is fed from said mechanism towards the press 42, along a guide plate 156.

Figure 12:
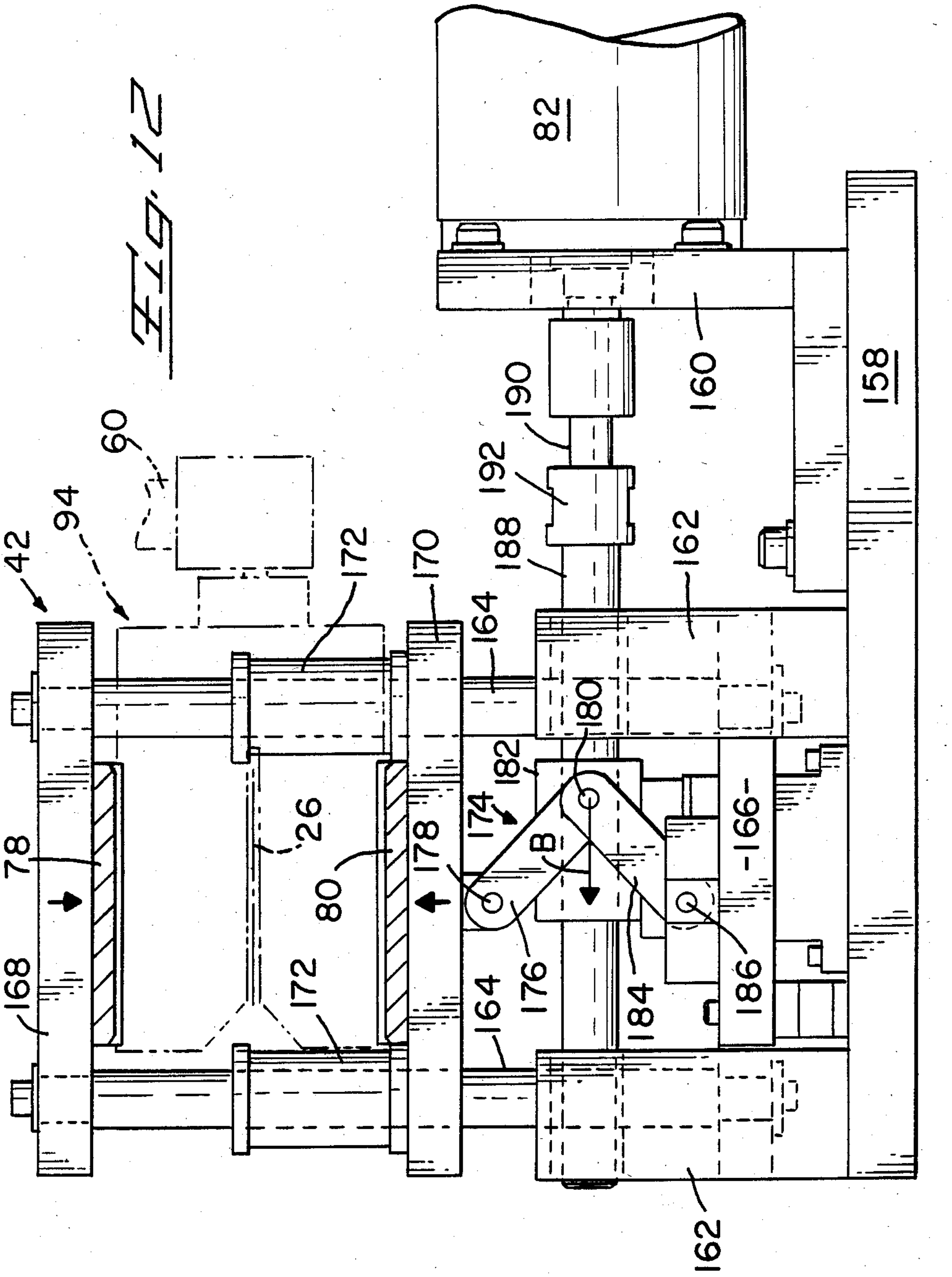
FIG. 12 is a view taken on the lines 12—12 of FIG. 3.

As shown in FIG. 12, the press 42 comprises a base plate 158 upon which is mounted a bracket 160 supporting the drive piston and cylinder unit 82, and bearings 162 slidably supporting vertical columns 164 for vertical sliding movement. The bases of the columns 164 are ganged by a horizontal plate 166 which is vertically moveable therewith. The platen 78 is mounted on a support plate 168 fixed to the tops of the columns 164, the platen 80 being mounted on a support plate 170 which is slidable on bearings 172, along the columns 164. A toggle linkage 174 has a first link 176 one end of which is pivoted at 178 to the plate 170, and the other end of which is pivoted at 180 to a collar 182 and to one end of a second link 184, the other end of which is pivoted at 186 to the plate 166. The collar 182 is fixed to a rod 188 connected to the piston rod 190 of the unit 82 by means of a releasable coupling 192. When the piston rod 190 is in a retracted position as shown in FIG. 12, the linkage 174 is in a broken position, so that the platens 78 and 80 are in a fully open position. When the piston rod 190 is advanced in the direction of the arrow B in FIG. 12, the linkage 174 is moved towards a straightened position whereby the columns 164 are depressed so that the platen 78 is moved towards the platen 80, the plate 170 being raised to move the platen 80 simultaneously towards the platen 78, so as to secure a body 10 and a cover 12 in the nest 94, when it has been inserted into the press 42, to the cable 26.

The cable gripping and cutting station 44 which comprises the units 84, 86 and 88, is best shown in FIGS. 13A to 13D. The unit 88 comprises a vertical frame 194 supported on a base structure 196 and having secured to its upper end, a first drive piston and cylinder unit 198 and to its lower end a second drive piston and cylinder unit 200, the unit 198 having a piston rod 202 and the unit 200 having a piston rod 204. Slidably mounted in the housing 194 on rods 206 are upstream upper and lower cable grippers 208 and 210, respectively, and downstream upper and lower cable grippers 212 and 214, respectively. The grippers 208, 210, 212 and 214 are U-shaped as seen in plan view, each having a cable gripping portion 215 provided by the base of the U. Mounted on the rods 206 are respective gripper drive blocks 216 each associated with a respective one of the grippers. Compression springs 217 surrounding the rods 206 are provided between each block 216 and its respective cable gripper. As explained below, the blocks 216 cooperate with cam follower levers 218*a* and 218*b*, respectively, to move the cable grippers 208, 210, 212 and 214 between open, connector and cable receiving positions and closed, cable gripping positions. The blocks 216 are urged away from their respective associated cable grippers by respective spring 219 acting between the blocks 216 and the frame 194.

The levers 218*a* and 218*b* are pivotally mounted to the frame 194 on pivot pins 220, each of these levers being provided with a first cam follower roller 222 at its end remote from the associated block 216 and with a second camming roller 224 engaging said block. The frame 194 has openings 226 and 228 in its upstream and downstream sidewalls, respectively. As shown in FIG. 1*a*, the lateral sides of the frame 194 are open.

Figure 13A:
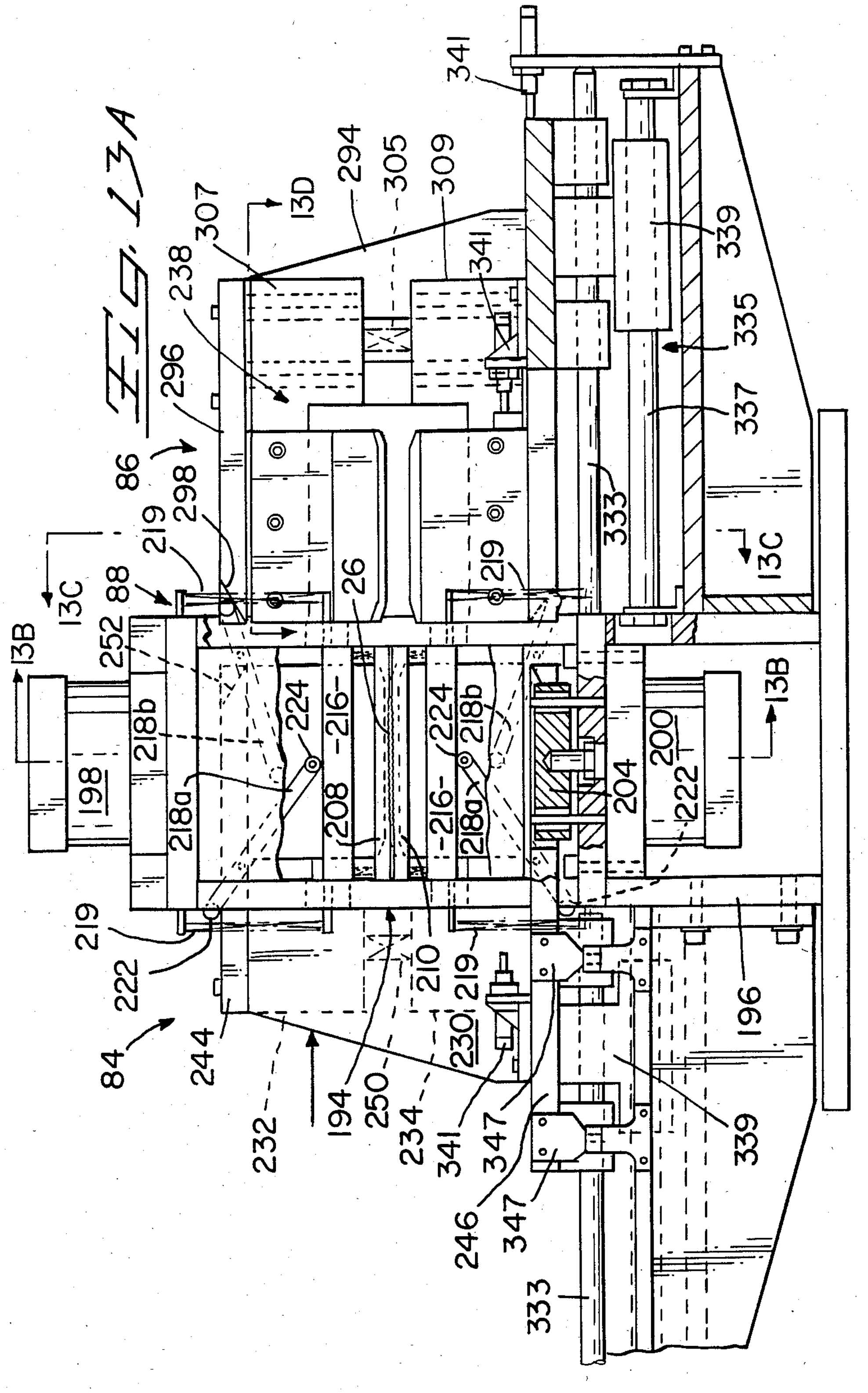
FIG. 13A is a view of a cable gripper unit and associated cable cutter units, of the assembly, taken on the lines 13A—13A of FIG. 3.
Figure 13B:
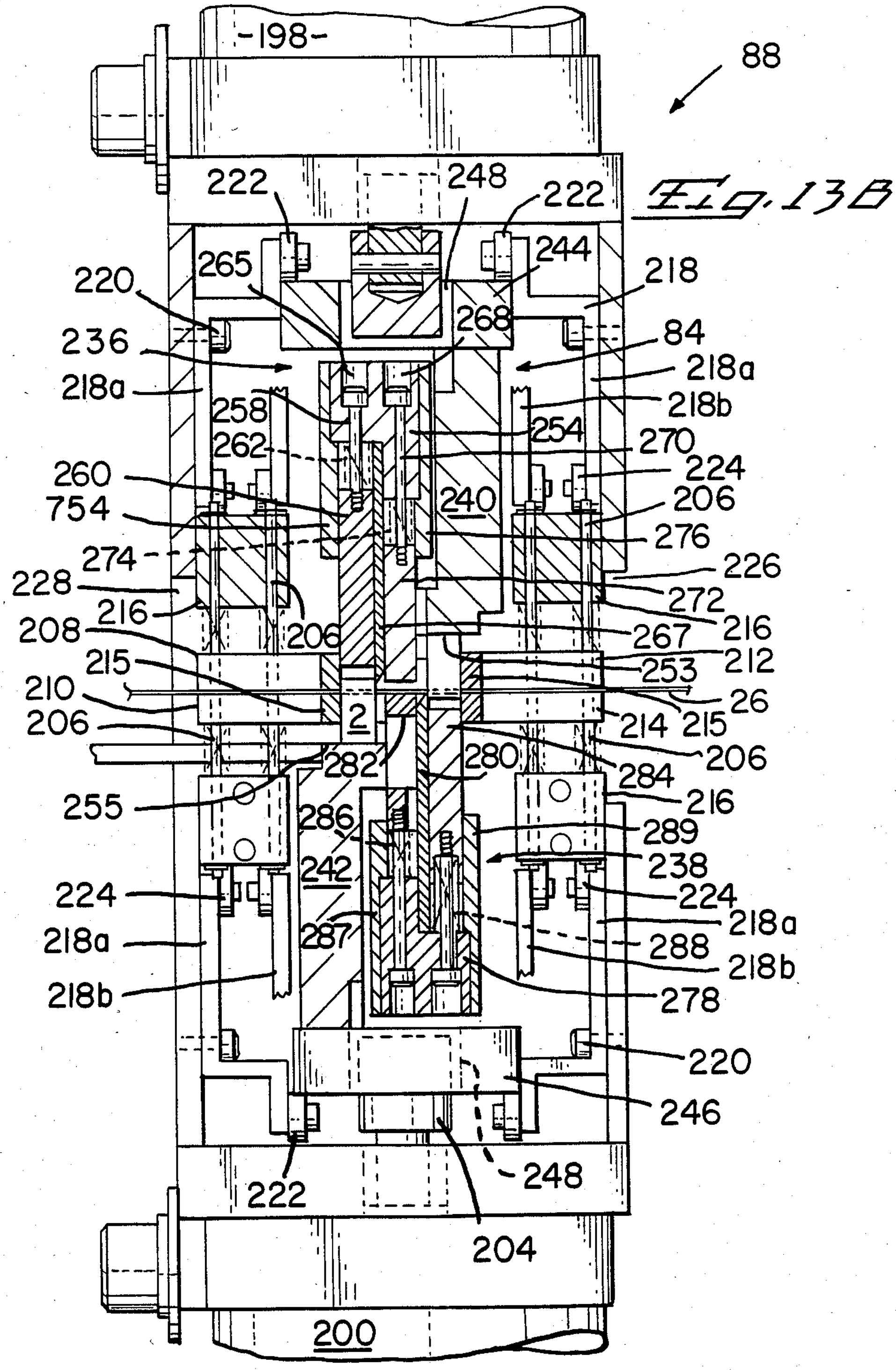
FIG. 13B is a view taken on the lines 13B—13B of FIG. 13A showing a first cable cutter unit received in the gripper unit.

The unit 84 (FIGS. 13A and 13B) comprises a frame plate 230 to which are slidably connected by crossed roller bearings 232, and 234, respectively a first cutter slide 236, and a second cutter slide 238, respectively. Fixed to support blocks 240 and 242 on the plate 230, are upper and lower cam follower plates 244 and 246, respectively, each having an opening 248 for receiving a respective one of the piston rods 202 and 204. The slides 236 and 238 are moved towards one another on the bearings 232 and 234 against the action of a return spring 250. Each plate 244 and 246 has an inclined cam surfaces 252 (one is shown in FIG. 13A) for cooperation with a pair of the rollers 222. The block 240 has a connector support surface 253, the block 242 having a connector support surface 255.

The slide 236 comprises a drive block 254 having a countersunk bores 256 in which slidably engage screws 258 secured to a connector hold down plate 260 which is slidable towards the block 254 against the action of springs 262 and relative to an upper cable cutting blade 264 secured to the block 254. The block 254 has further countersunk bores 268 through which slidably extends screws 270 secured to a cable gripping block 272 which is moveable towards the block 254 against the action of springs 274 and relative to a guide plate 276 for the block 272. There are two each, of the bores 256 and 268 and their associated screws 258 and springs 262 and 274, although only one of each of these items is shown.

The slide 238, comprises a cable cutting blade support block 278 to which is fixed a lower cable cutting blade 280, a cable gripping block 282 and a connector hold down plate 284, disposed on opposite sides of the blade 280 being slidable relative thereto, towards the block 278 against the action of springs 286 and 288 respectively. Guide plates 287 and 289 for the block 282 and the plate 284, respectively are secured to opposite sides of the support block 278.

The unit 86 (FIGS. 13A, 13C and 13D) comprises a frame plate 294 having thereon an upper cam plate 296 and a lower cam plate 297 each having an inclined cam surfaces 298 (one is shown in FIG. 13A) for cooperation with a respective pair of the rollers 222. Each cam plate 296 and 297 has an opening 298 for receiving a respective one of the piston rods 202 and 204. Also fixed to the frame plate 294 is a connector support block 300 having connector supporting surfaces 302 and 304. An upper slide 306 and a lower slide 308 are vertically slidable towards one another with respect to the frame 294, against the action of a return spring 305, on crossed roller bearings 307 and 309, respectively. The slide 306 comprises a cable cutter blade support block 310 to which are secured cable cutter blades 312 and 314 on either side of which are connector hold down plates 316 and 318 respectively, and between which is a cable gripper block 320. The plates 316 and 318 and the block 320 are slidable towards the block 310 against the action of springs 322 surrounding screws 323 which are slidable in countersunk bores 311 in the block 310.

The slide 308 comprises a cable gripper support block 328 in which is slidably mounted a cable gripper block 330 which is moveable into the support block 328 against the action of a spring 332.

Each of the cutter units 84 and 86 is moveable into and out of the cable gripping unit 88 by means of a rodless piston and cylinder unit 335, that is to say, a unit having a cylinder 337 in which is disposed a piston (not shown) which is magnetically coupled to a slide 339 so as to be capable of moving the slide along the cylinder 337 and along guide rods 333. Each slide 339 is secured to the base of its respective unit 84 or 86. Buffers 341 are provided at the end positions of these units. The positions of the units 84 and 86 are indicated to the control system by switches 347, only two of which are shown.

Figure 15:
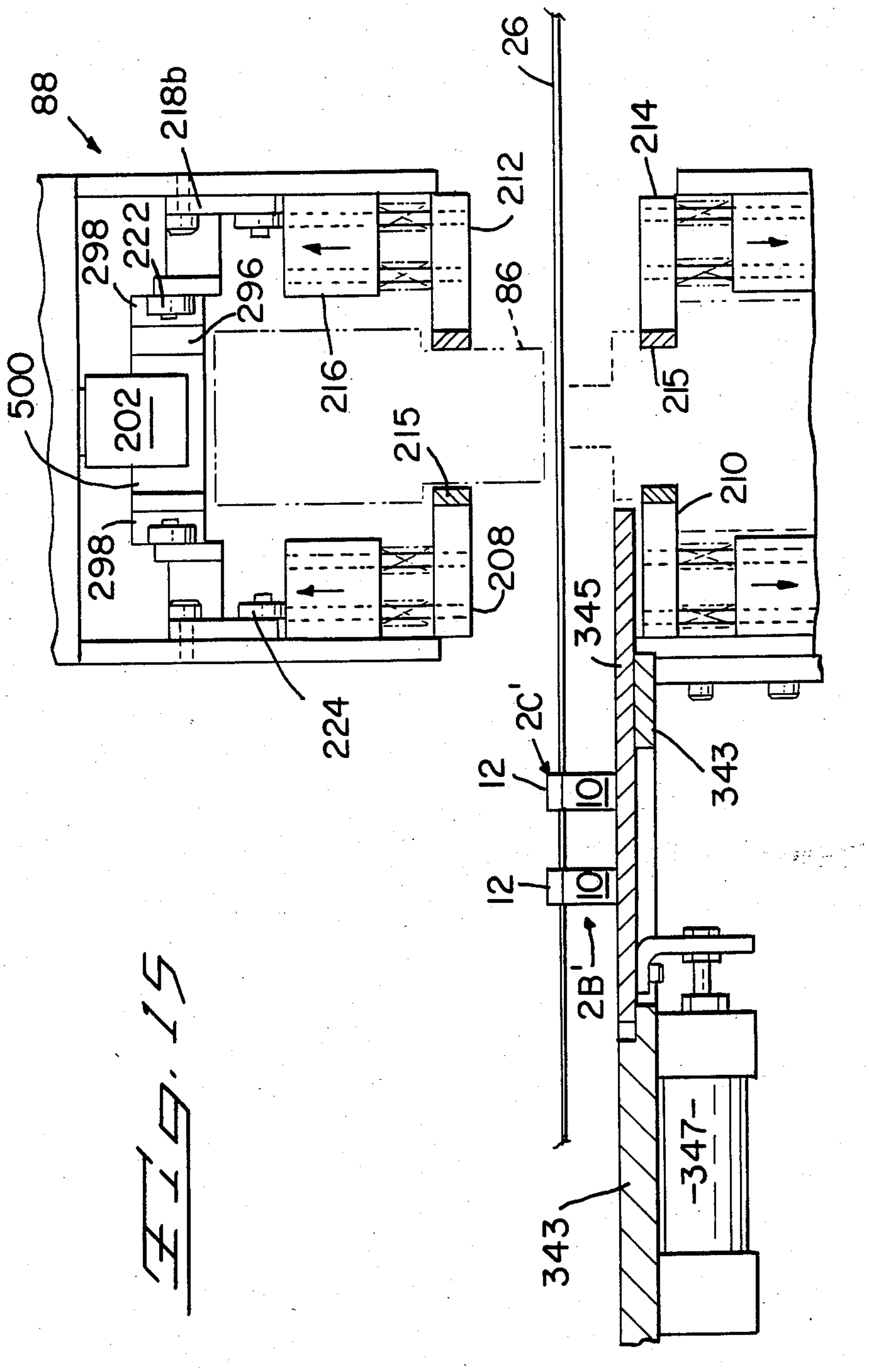
FIGS. 15 to 17 are diagrammatic sectional views illustrating the operation of the cable gripper unit.
Figure 16:
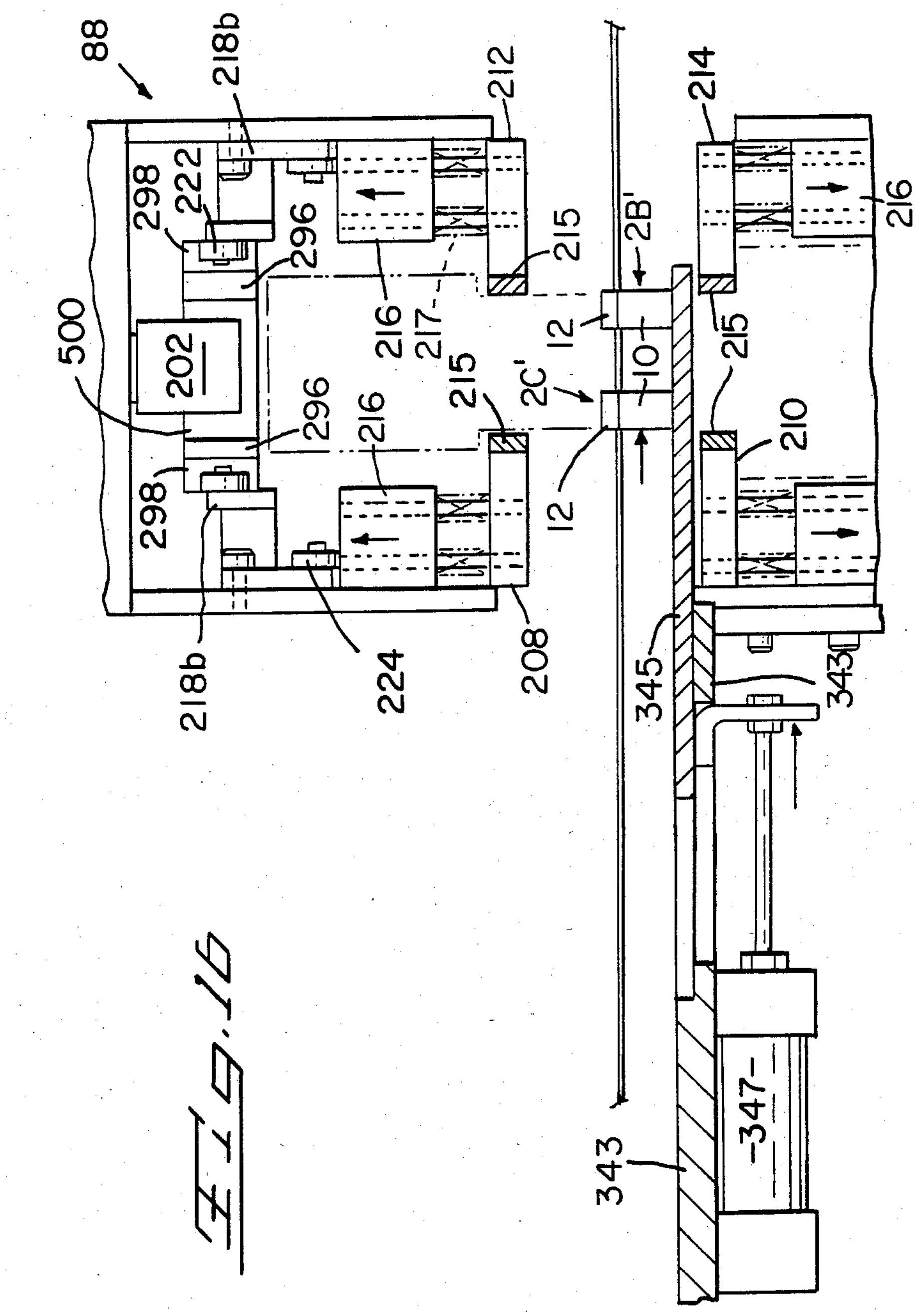

A platform 343 (FIGS. 3 and 15 to 17) extends from the press 43, at a position substantially centrally of its height, up to the unit 88, the platform 343 comprising a slidable portion 345 which is movable by means of a piston and cylinder unit 347 between a retracted position (FIG. 17) and a fully advanced position (FIG. 16), in which the slide portion 345 extends between the bases 215 of the two pairs of grippers 208, 210, and 212, 214, when these are in their open positions as shown in FIG. 16.

Figure 10A:
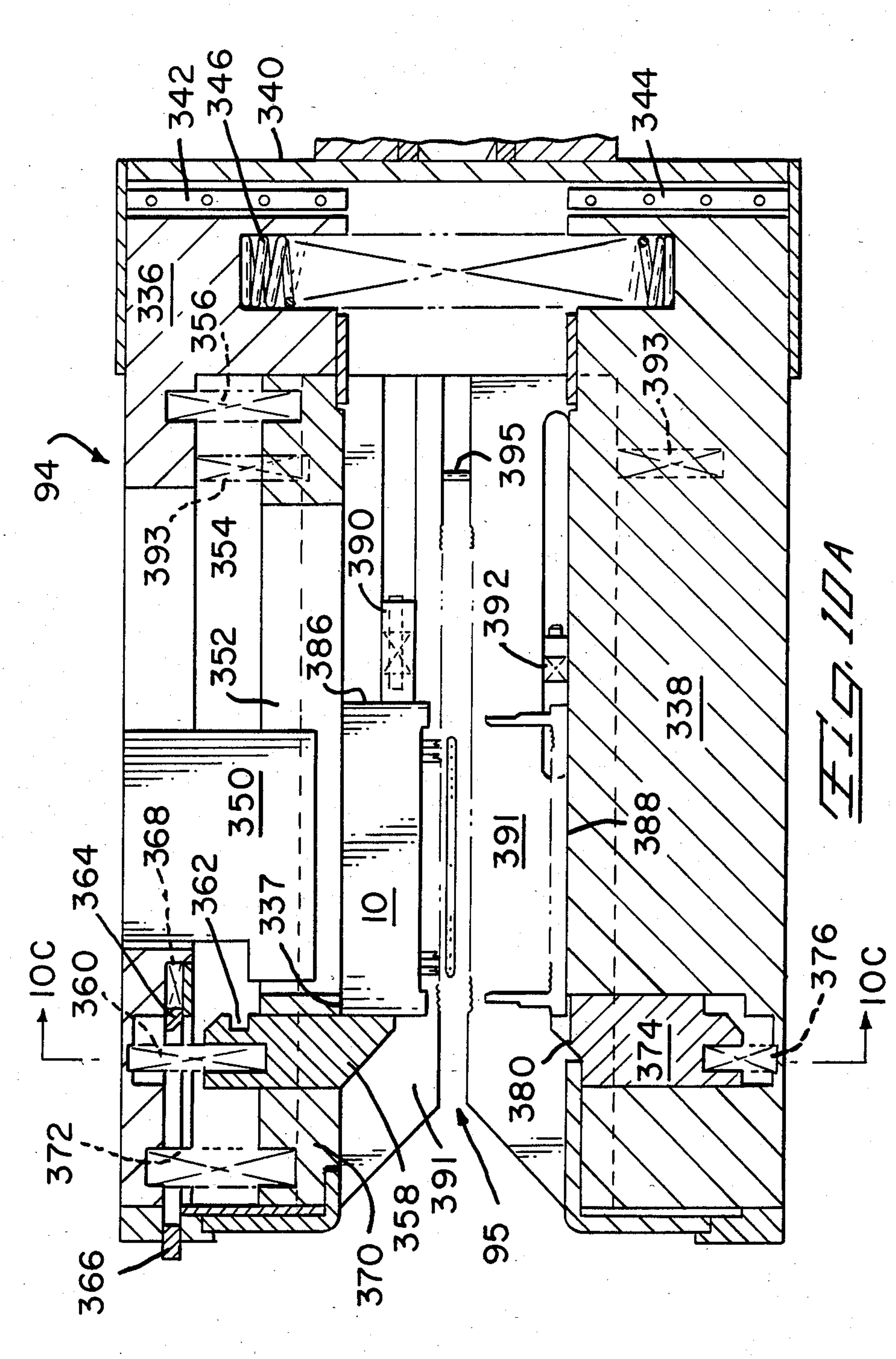
FIG. 10A is a longitudinal section view of the transfer nest, showing the nest in an open position.
Figure 10B:
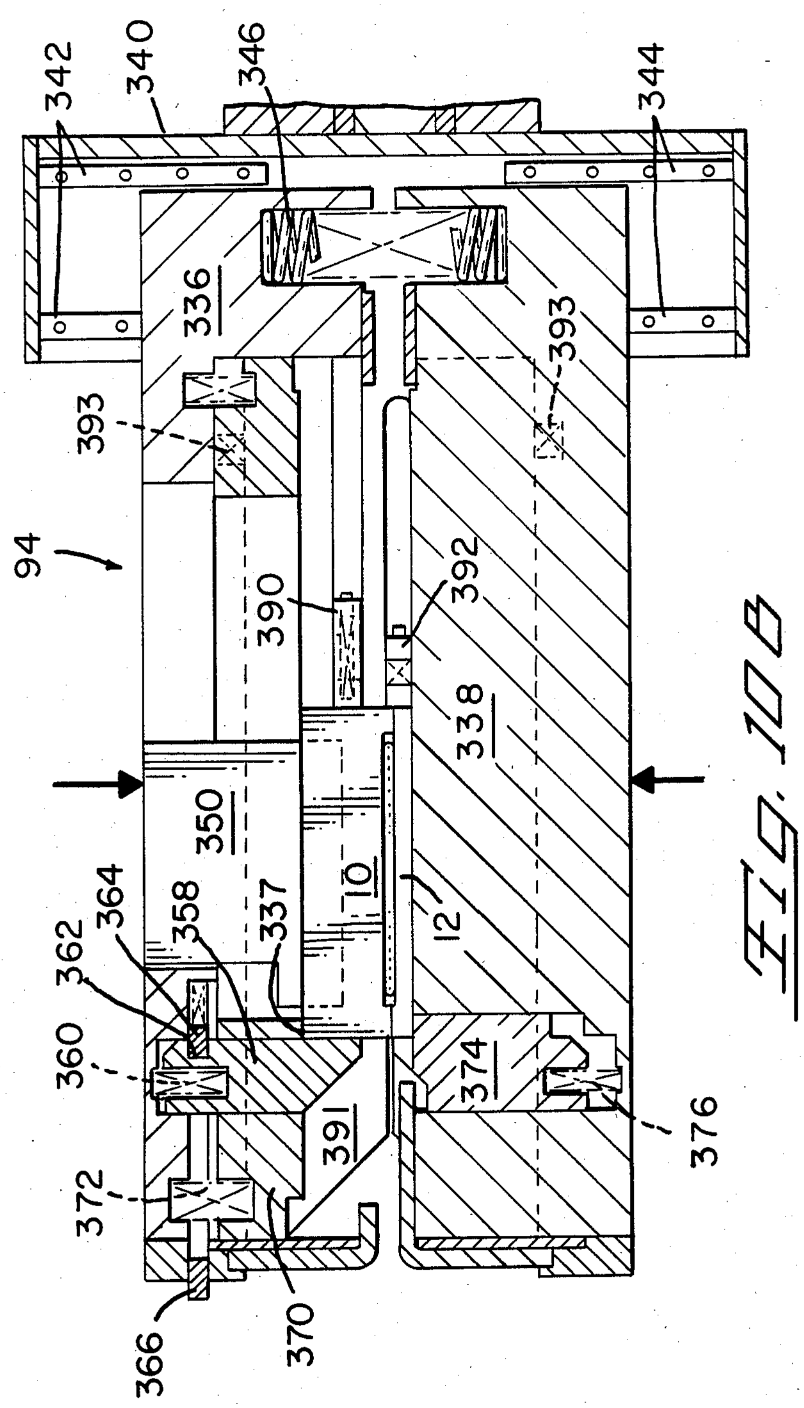
FIG. 10B is a similar view to that of FIG. 10A but showing the nest in a closed position.
Figure 10C:
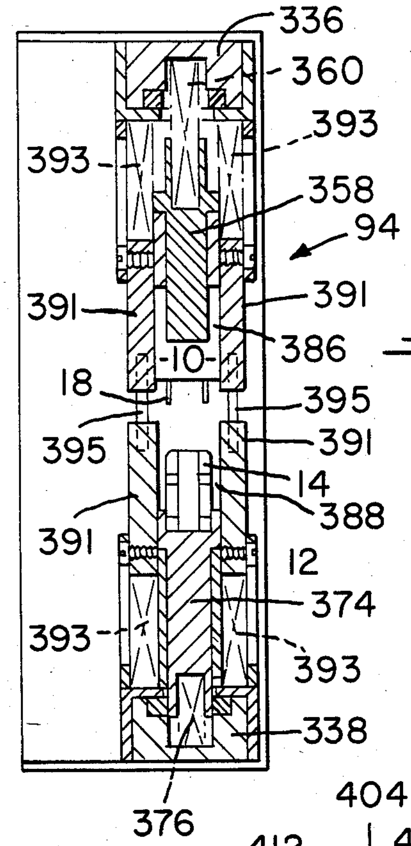
FIG. 10C is a view taken on the lines 10C—10C of FIG. 10A.

As shown in FIGS. 10A, 10B and 10C, the connector transfer nest 94 comprises plungers 336 and 338 which are slidable towards and away from one another in a frame 340 on crossed roller bearings 342 and 344, respectively, against the action of a return spring 346, by means of the platens 78 and 80 of the press 42. A bussing blade 350 fixed to the plunger 336 projects through a slot 352 in a connector abutment plate 354 with respect to which the plunger 336 is depressable against the action of a spring 356. The plunger 336 is also depressable with respect to a connector latch bolt 358 against the action of a spring 360. The latch bolt 358 has a notch 362, in which is engageable, a latch plate 364 in the plunger 336. The latch plate 364 is depressable, against the action of a spring 368, by the screw 110 on the ram 66 at the station 38, by engagement of the screw 10 with a projecting nose 366 on the plate 364. A slide block 370 which is fixed to the latch bolt 358 is depressable with respect to the plunger 336 against the action of a spring 372. A further latch bolt 374 is slidably mounted in the plunger 338 is depressable with respect thereto against the action of a spring 376. The latch bolt 374 has a cam surface 380. The plunger 336 defines a connector body receiving channel 386, the plunger 338 defining a connector cover receiving channel 388. Mounted at the right hand (as seen in FIGS. 10A and 10B) end of the channel 386 is a spring loaded connector body buffer 390, a spring loaded connector cover buffer 392 being mounted in the channel 388 at the right hand (as seen in FIGS. 10A and 10B) end thereof. As best seen in FIG. 10C, the channels 386 and 388 are each bounded on each side thereof by a cable clamp plate 391 loaded by a spring 393, the clamp plates bounding the respective channels being slidably connected by guide rods 395.

Figure 9A:
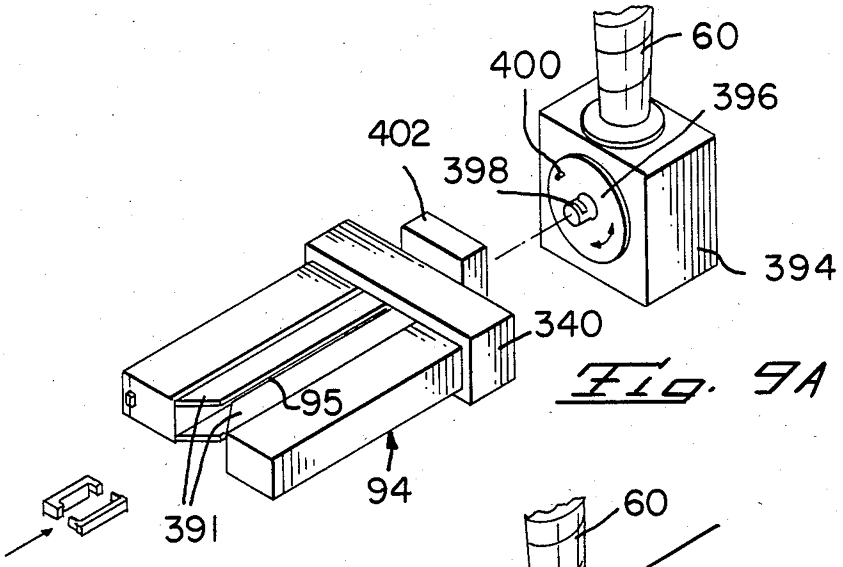
FIGS. 9A to 9C are perspective views illustrating the picking up and orienting of a connector transfer nest by means of a robot.
Figure 9B:
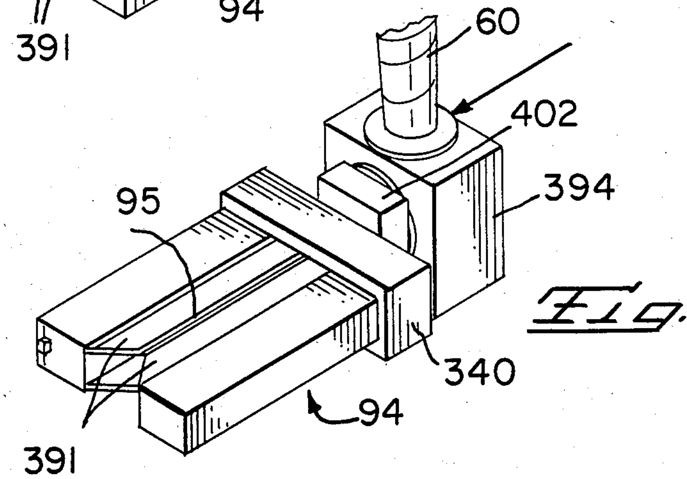
Figure 9C:
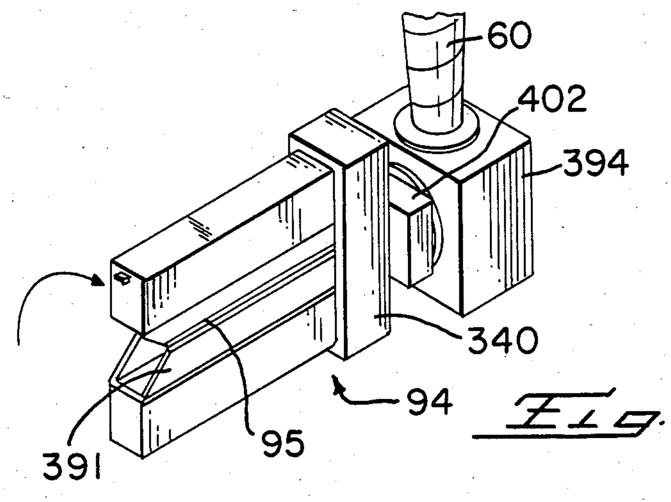
Figure 11:
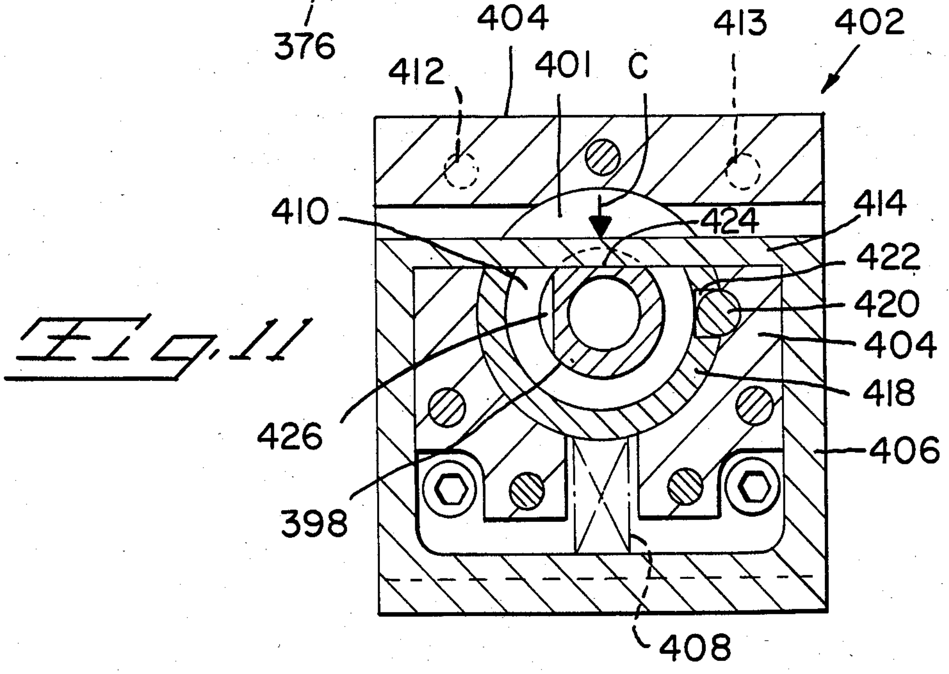
FIG. 11 is a view taken on the lines 11—11 of FIG. 14.

The arm 60 of the robot 34 has thereon a robotic hand 394, which as best seen in FIGS. 9A to 9C comprises a rotary disc 396 having thereon a central spigot 398 and an eccentrically positioned pin 400 both projecting at right angles to the arm 60 and to the plane of the disc 396. The spigot is formed with a circumferentially extending notch 401, and has a tapered distal end 403. An adaptor 402 (best seen in FIGS. 11 and 14) secured to the frame 340 of the nest 94 has a body 404 to which is mounted a frame 406 urged in the direction of the arrow C in FIG. 11 by a spring 408. The body 404 has a central opening 410 for receiving the spigot 398 and, positioned eccentrically thereof, circular bores for alternatively receiving the pin 400. A resilient bar 414 of the slide 406 is normally urged by the action of the spring 408 into a position in which it extends across the opening 410 as shown in FIG. 11, the bar 414 being moveable by pressing the slide 406 upwardly (as seen in FIG. 11) against the action of the spring 408, into a recess 416 in a bushing 418 secured in the body 404 and defining the opening 410. The bushing 418 is maintained in an angularly fixed position with respect to the body 404 by means of a pin 420 engaging in a slot 422 in the bushing 418. As shown in FIG. 11, flats 424 and 426 in the notch 401 extend at right angles to one another.

Figure 14:
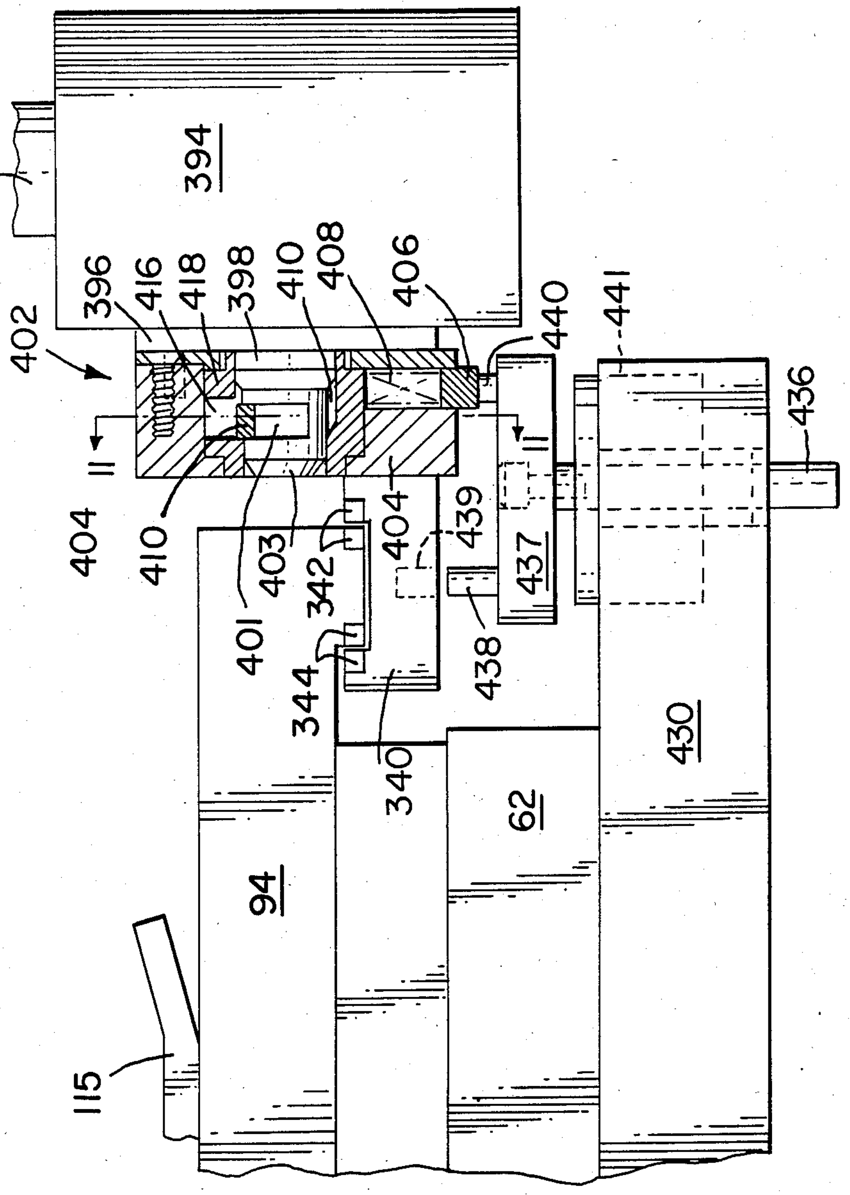
FIG. 14 is a diagrammatic side view of part of the pick-up station showing an adaptor on an arm of the robot, in cross-section.

In order to secure the nest 94 to the hand 394, the spigot 398 is inserted into the opening 410, raising the bar 414 with its tapered end 403 so that the bar finally snaps back into the notch 401, engaging the flat 424 or 426 according to the orientation of the nest 94. The pin 400 engages in the bore the bar 412 or 413, also according to the orientation of the nest 94. The nest 94 can thus be secured to the rotary plate 396 of the hand 394 in either of two positions angularly spaced from one another by 90 degrees. The nest 94 can be released from the robotic hand 394, by depressing the slide 496 against the action of the spring 408 and then withdrawing the nest 94 from the adaptor 402. As shown in FIGS. 8 and 14, the nest securing unit 430 comprises a plunger 436 having thereon a plate 437 on which are pins 438 and 440, the pin 438 being longer than the pin 440. The plunger can be raised by means of a drive unit 441, to engage the pin 438 in an opening 439 in the frame 340 of the nest and to depress the frame 406 of the adaptor 402, when the nest is positioned on the table 62, to secure the nest against movement longitudinally thereof and to release the adaptor 402 from the robot arm 60. Thus if required, the arm 60 can be withdrawn leaving the nest on the table 62. By lowering the plunger 36, the nest is released for removal from the table 62 and is secured to the arm 60.

At the beginning of a cycle of operation of the lead making assembly, the robot 34 is operated by its control system, in accordance with the program of the programmable logic controller, to insert the nest 94, with the aid of the guide rolls 111 and guide blocks 113, beneath the guide plate 115 on the table 62. The unit 430 being then actuated to advance the plunger 436 so that the projection 438 engages in the opening 439 and so that the projection 440 releases the adaptor 402 from the arm 60.

With the nest 94 so secured at the station 38, the latch bolt 358 having been latched in its raised position during a previous cycle of operation, the drive unit 98 is actuated to advance the ram 66 so as to drive a connector body 10 and a cover 12 into the nest 94, separated by the bar 105. As the arms 102 and 104 drive the body 10 and the cover 12, respectively, into the nest 94, the separator bar 105 which moves ahead of these arms, serves to stabilize the body 10 and cover 12 as the ram 66 is advanced. The leading end of the cover 12 engages the cam surface 380 of the latch bolt 374 and depress it against the action of its spring 376, the body 10 and lid 12 sliding into the respective channels 386 and 388 until the body and the cover are halted by the buffers 390 and 392, respectively, at which time, the screw 110 on the ram 66 has depressed the nose 366 on the nest so as to release the latch bolt 358 and the latch bolt 374 snaps back into its raised position under the action of its spring 376; whereby both the body 10 and the housing 12 are secured in the nest in spaced aligned relationship as shown in FIG. 10A. The ram 66 is then retracted by its drive unit 98, the plunger 436 is lowered to release the nest 94 from the table 62 and to secure the adaptor to the hand 394, and the robot 34 is operated to withdraw the nest 94 from the table 62 and then to rotate the plate 396 on the hand 394 into the required angular position, with the cover 12 either up or down as the case may be. The robot 34 is then operated to transfer the nest 94 into the press 42, so that the cable 26 is inserted into the slot 95 of the nest 94 so as to extend between the body 10 and cover 12 as shown in FIG. 10A, the drive unit 82 is actuated to cause the press platens 78 and 80 to close the plungers 336 and 338 towards one another as shown in FIG. 10B whereby the body 10 and cover 12 are mated to connect the conductors 27 of the cable 26 to the terminals 18 and the bussing blade 350 enters the board slot 28 of the body 10 and thereby makes electrical contact with the springs 20 of the terminals 18. The continuity tester 74 scans the conductors of the cable 26 and should it detect electrical discontinuity or short circuiting, emits a signal to cause the programmable logic controller to operate the rotary actuator 93 to rotate the flip chute 92 in a clockwise (as seen in FIG. 1A) sense. Also, as the plungers 336 and 338 are moved towards one another, the latch bolt 358 of the plunger 336 is raised, as seen in FIGS. 10A and 10B by virtue of its engagement of a shoulder 337 thereon with the body 10 so that the latch plate 364 engages in the notch 362 of the latch bolt 358 whereby the latter is retained in a raised position to allow the completed connector to be removed from the nest 94 and a fresh body 10 and cover 12 subsequently to be inserted into the nest 94 at the station 38. When the unit 82 is actuated to open the platens 78 and 80, the plungers 336 and 338 are returned to their open position by the spring 346 and body 10 and cover 12, now secured to the cable 26, are released from the nest 94, the spring force exerted by the buffer 392 being very light. Thus, upon withdrawal of the nest 94 from the press 42, the completed connector 2 is left in the press supported on the cable 26.

Figure 13C:
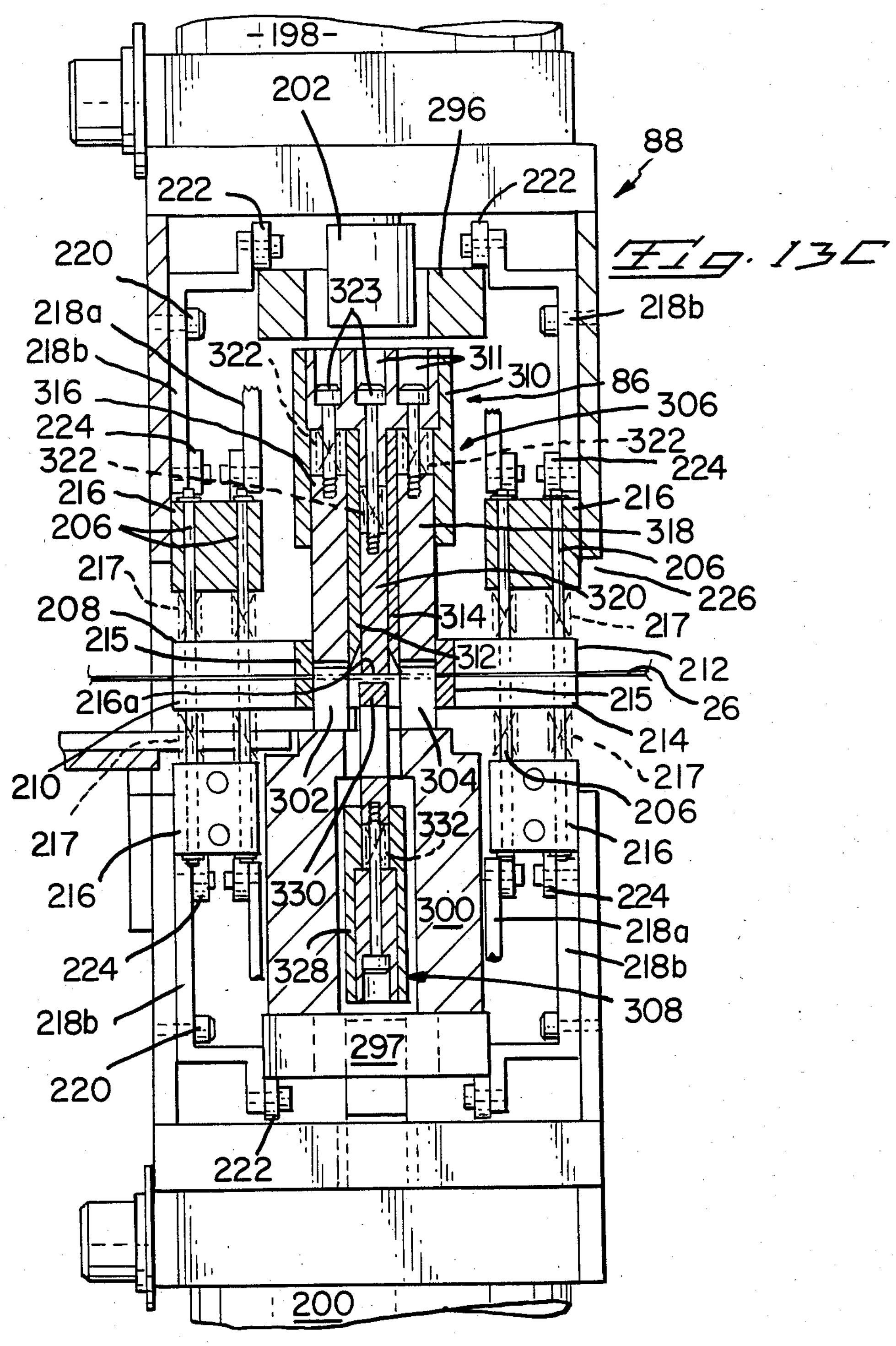
FIG. 13C is a sectional view taken on the lines 13C—13C of FIG. 13A through a second cable cutter unit, but showing said unit received in the gripper unit.
Figure 17:
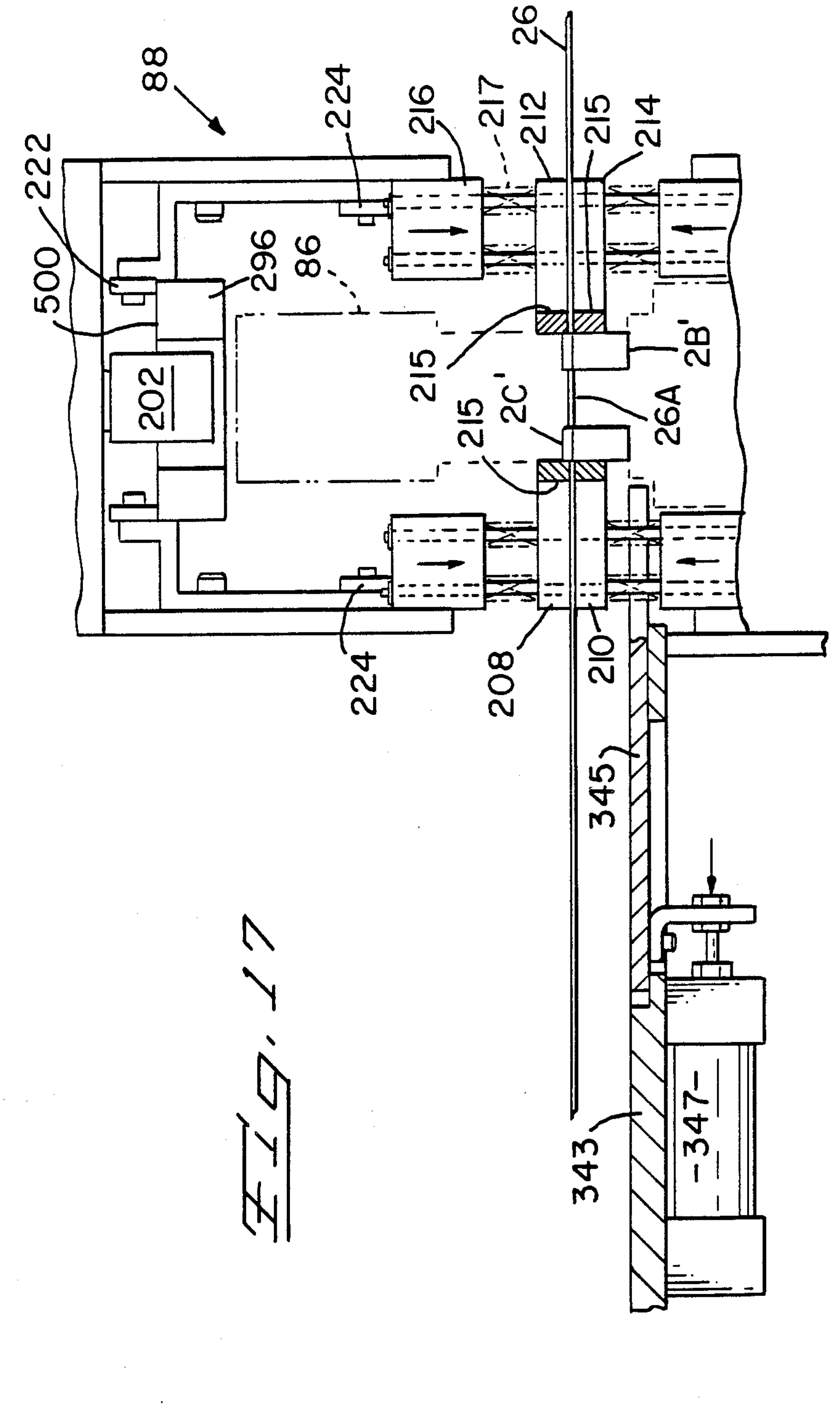

When the motor 148 of the mechanism 76 is subsequently actuated to advance the cable 26, both of the units 84 and 86 are in a position in which they are fully withdrawn from the unit 88 whereby the levers 218*a* and 218*b* are in a tilted position in which the grippers of the two pairs 208, 210 and 212, 214 are fully spaced apart as shown in FIG. 15. The unit 347 is now actuated to advance its piston rod so that the slide portion 345 of the platform 343, upon which, according to the example shown in FIGS. 15 to 17, two connectors 2B′ and 2C′ having the same vertical orientation have been deposited by virtue of the advance of the cable 26, is advanced to position these two connectors centrally, between the two pairs of open grippers as shown in FIG. 16. Since the connectors have the same vertical orientation, the cutter unit 86 is then advanced into the gripper unit 88, by means of the drive unit 335 of the unit 86, whereby the rollers 222 of the levers 218B ride up the cam surfaces 298 and onto the flat upper surface 500 of the plate 296 (FIG. 17) so that the rollers 224 of the 218*b* are forced against the blocks 216, whereby the grippers are closed about the cable 26 against the action of the springs 217 as shown in FIG. 17 so as to grip the cable 26, thereby retaining the connectors in a position to enable the cable cutting blades 312 and 314 to remove, the slug 26A from between the completed harness comprising the connector 2C′ and a further connector previously secured to its other end, and the partially completed harness having the connector 2B′ secured to its leading end. As the grippers close, the unit 347 is actuated to retract its piston rod as shown in FIG. 17. As the unit 84 is further advanced into the unit 88, the supporting surfaces 302 and 304 of the block 300 are moved to a position to support the respective connectors 2B' and 2C', the blocks 316 and 318 being moved into a position over the respective connectors and the blades 312 and 314 are thereby positioned against the slug 26A of the cable 26, the cutting edges of these blades being closely adjacent to the inward surfaces of the connectors as shown in FIG. 13C. The drive units 198 and 200 are now actuated so that their piston rods 202 and thus the slides 306 and 308 are thereby advanced, so that the gripper blocks 320 and 330 grip the slug 26A between them and the blades 312 and 314 are advanced to sever the slug 26A from the remainder of the cable 26 against the inward faces of the connectors. The drive units 198 and 200 are now actuated to retract their piston rods, so that the slides 306 and 308 are returned to their FIG. 13C positions by means of the springs 322 and 332, after which the cutter unit 84 is withdrawn from the gripper unit 88 by means of its drive motor 335, whereby the rollers 218 of the levers 218*b* run down the cam surfaces 298 so that the pairs of grippers 208, 210 and 212, 214, are returned to their FIG. 15 positions. The completed harness which was severed from the remainder of the cable 26 as described above, falls down onto the conveyor 90 and is thereby conveyed onto the flip chute 92 so as to fall either into the box 94 or the box 96 in accordance with the result of the continuity and short circuiting test previously carried out by the tester 74.

If the connectors connected by the slug 26a are oppositely vertically oriented, that is to say if the cover 12 of one is up and that of the other is down, then the cable cutter unit 86, instead of the unit 84 is advanced into the cable gripper unit 88. In this case, when the pairs of grippers 208, 210 and 212, 214 have been closed, by virtue of the rollers 222 of the levers 218*a* having ridden up the cam surfaces 252 and the drive units 198 and 200 have been actuated to advance their piston rods 202 and 204, so as to drive the slides 236 and 238 towards one another, the connectors are secured between the plate 260 and the surface 255 and between the surface 253 and the plate 284, respectively, the slug 26*a* being gripped between the blocks 272 and 282, the blades 264 and 280 moving in, in opposite directions, against the cable 26 to cut out the slug 26*a* therefrom against the inwardly facing surfaces of the connectors to which the blades are closely adjacent. When the units 198 and 200 are actuated to retract their piston rods 202 and 204, the parts of the slide 236 are returned by the springs 262 and 274, the parts of the slide 238 being returned by the springs 286. The unit 86 is then retracted from the unit 88 by means of its drive motor 335 whereby the pairs of grippers 208, 210 and 212, 214 are opened again to receive the next pair of connectors.

The cable feed mechanism 76 may be operated so as to overfeed the cable initially, and so as finally to retract the cable precisely to position, the connectors secured thereto.

Figure 2:
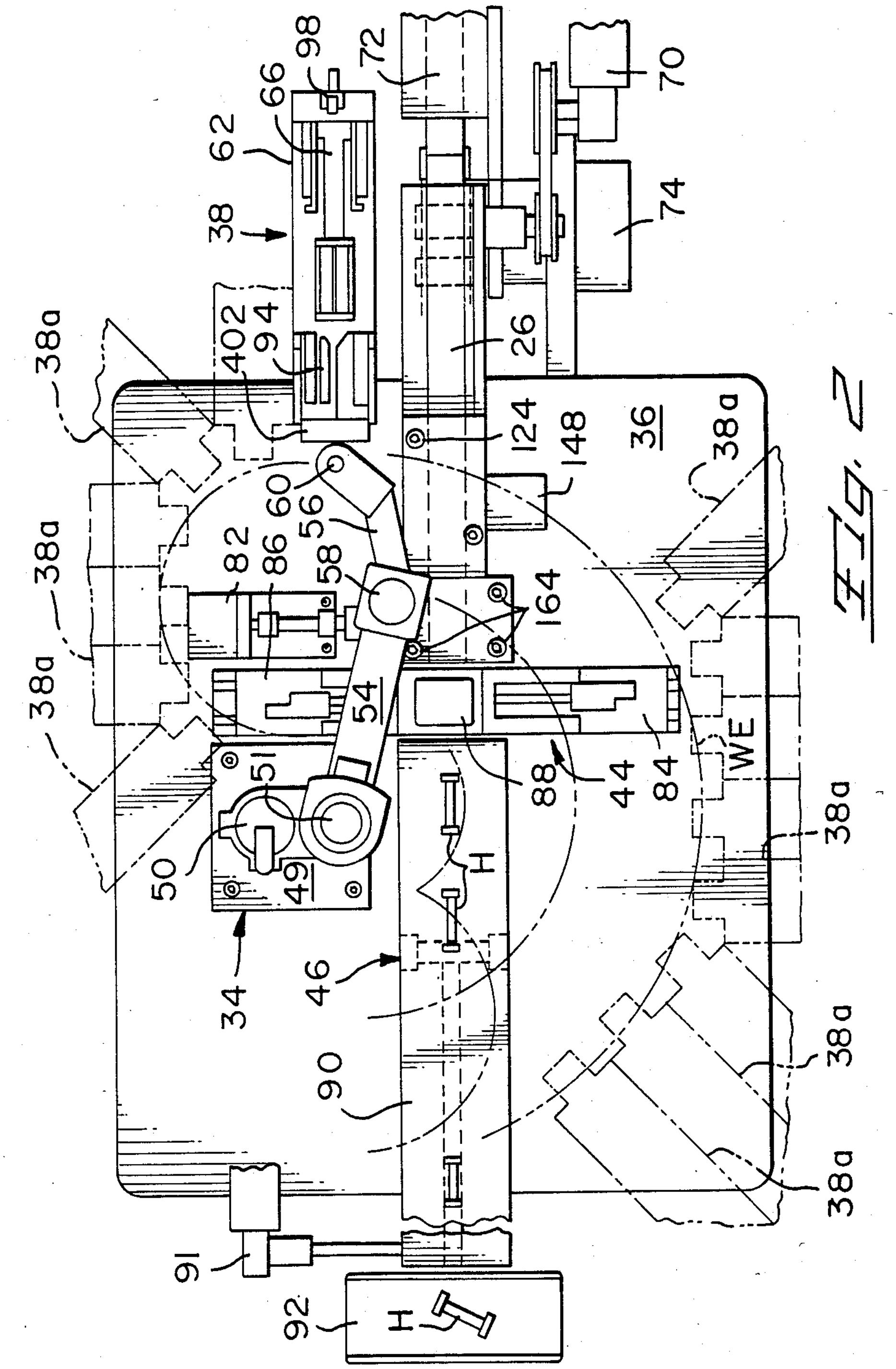
FIG. 2 is a top plan view of the assembly.
Figure 3:
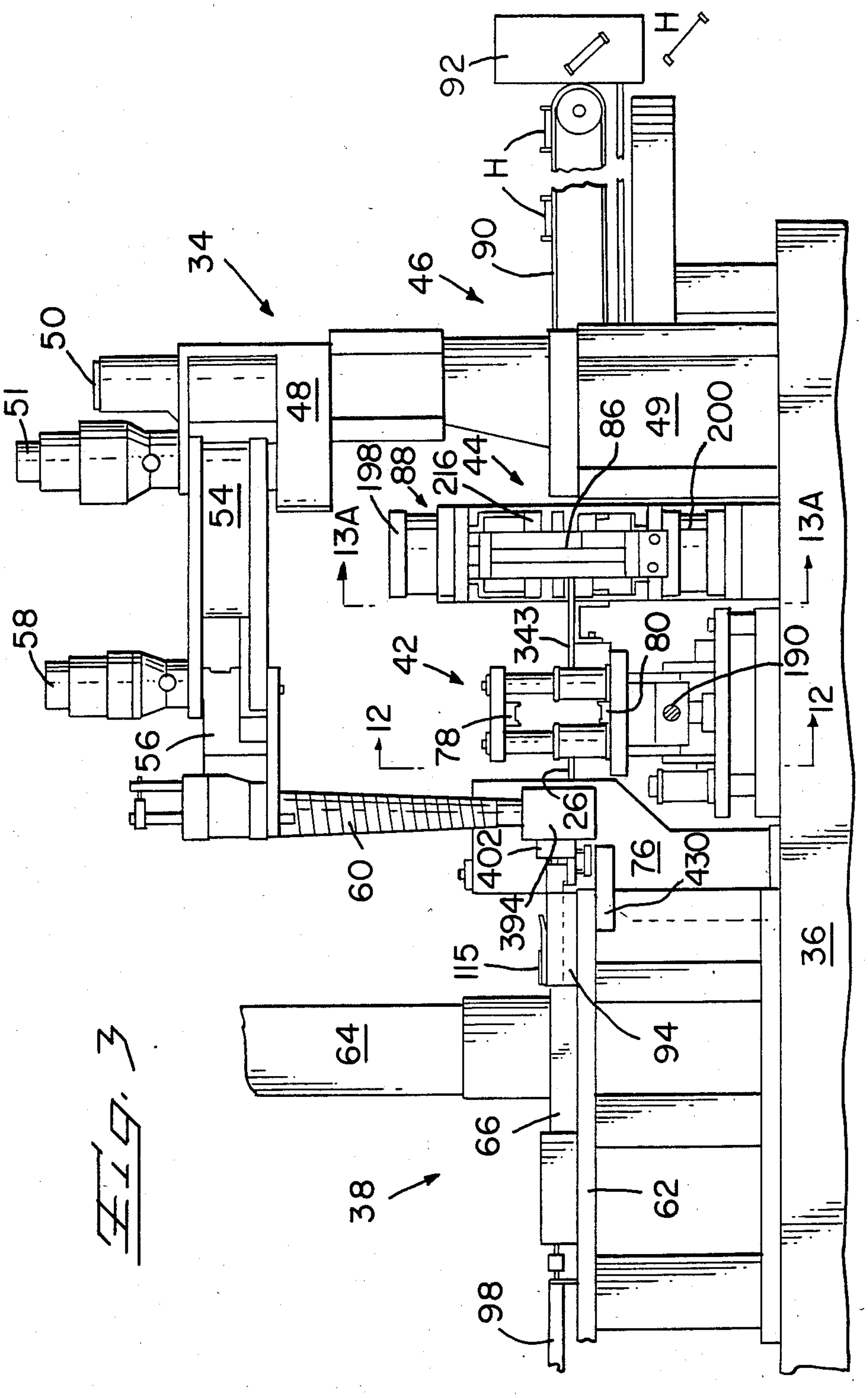
FIG. 3 is a rear view of the assembly.

When a plurality of different connectors, for example, connectors with differing polarizing means are to be applied to the cable, according to the program, a plurality, or indeed a multiplicity, if such is necessary, of connector pick up stations, similar to the station 38, may be provided in the work area as indicated in FIG. 2 in broken lines, in which these additional pick-up stations are referenced 38*a*. By virtue of the provision of the pin 440 on the plate 437, a nest may be left at one pick-up station, whilst the robot is transferring nests from other pick-up stations to the press. As will be apparent from FIG. 2, the work envelope WE of the robot will allow the use of a very substantial number of additional pick-up stations.

If desired, some or all of the additional pick-up stations may be loaded with the same kind of connector, the robot being programmed to pick-up connectors from other stations in sequence, when the supply of connectors in the magazine of one pick-up station has become exhausted.

The harness making assembly could readily be adapted for use with connectors having insulation displacement terminals, but which are not provided with a cover for stuffing the cable conductors into the terminals. To this end, a plunger of the nest may be provided with tooling for carrying out the stuffing operations.

Figure 27:
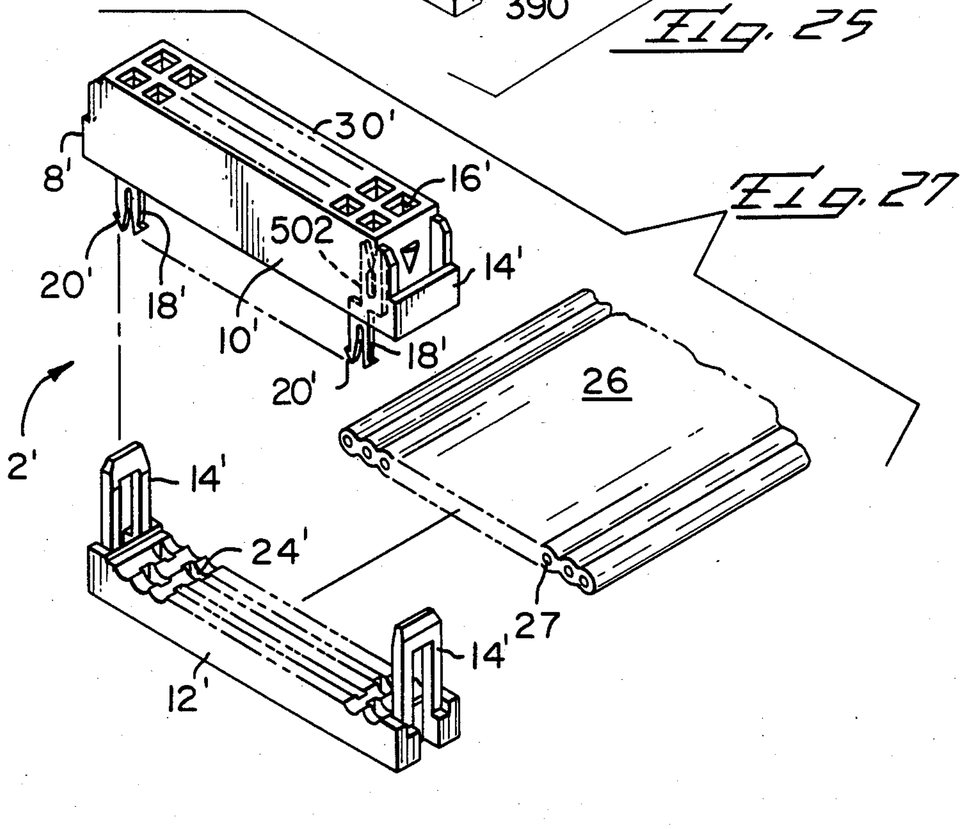
FIG. 27 is a perspective view of a further electrical connector in association with a ribbon cable to be terminated by means of the connector.

Reference will now be made to FIGS. 18 to 27, in which parts having the same function as those described above with reference to FIGS. 1 and 10A to 10C are referenced in the same way as in those figures, but with the addition of a prime symbol. FIGS. 18 to 26 show a modified form, 94', of the nest 94, described above, for use with an electrical connector which is shown in FIG. 27.

The connector 2' differs from the connector 2 described above with reference to FIG. 1, in that it is a post receptacle connector, rather than a connector for receiving an edge of a circuit board. In the connector 2', the terminals 18' in the housing 10' have post receptacle portions 502 in place of the contact spring portions 20, the cavities 16' opening into the mating face 30' instead of communicating with a board channel.

The nest 94' differs from the nest 94 in a number of ways which will now be described.

Figure 18:
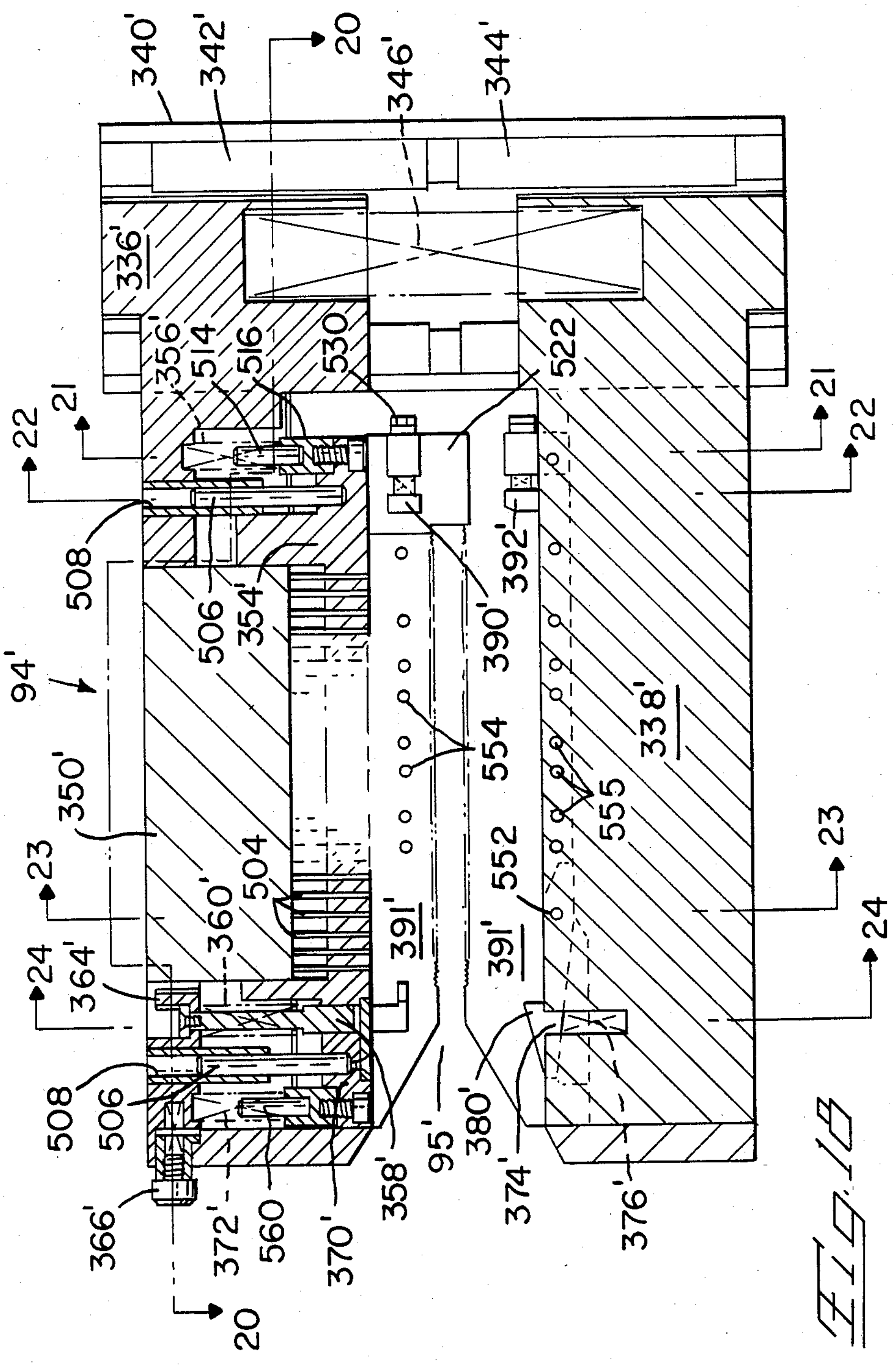
FIG. 18 is a sectional view of a modified form of the nest taken on the lines 18—18 of FIG. 19.
Figure 21:
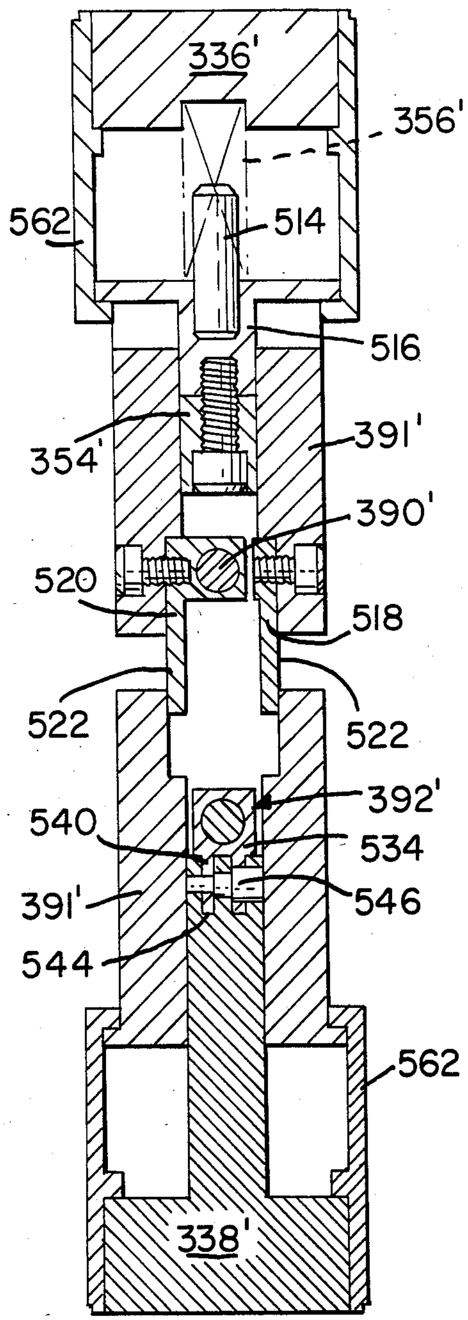
Figure 22:
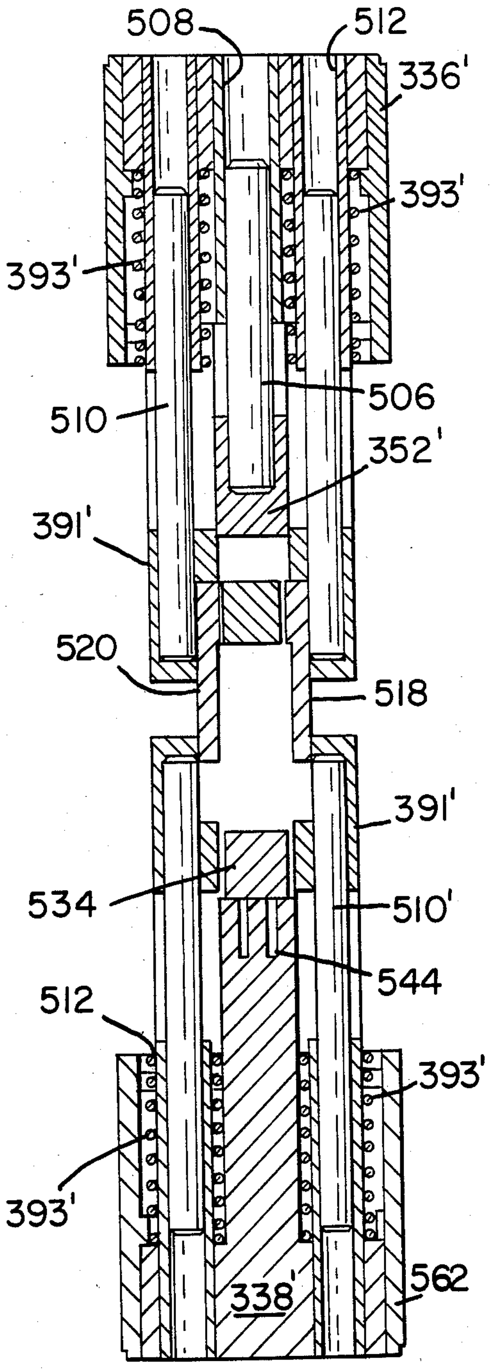
Figure 23:
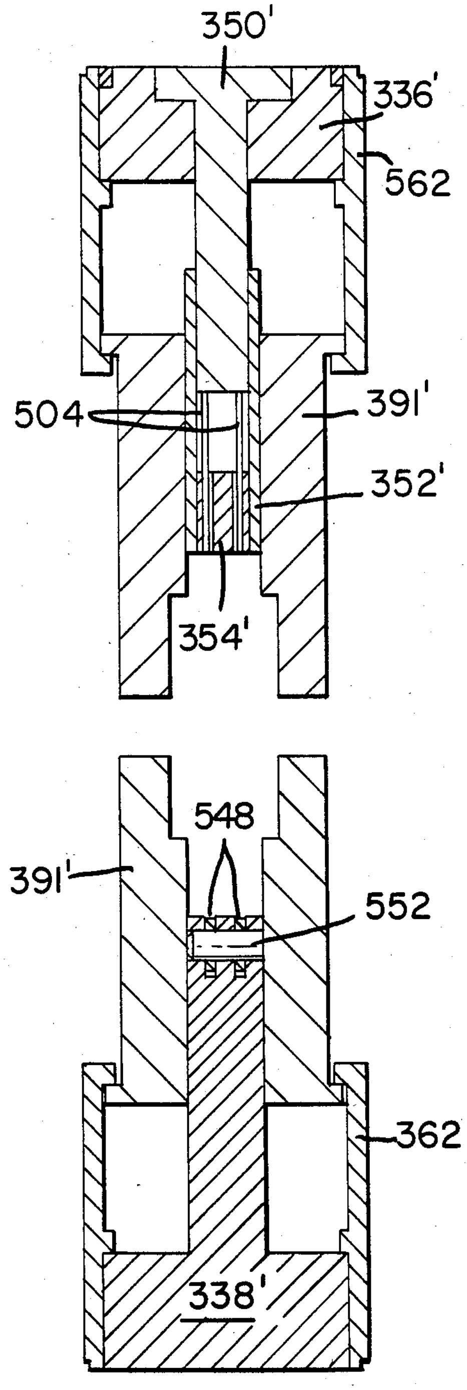

The bussing plate 350' is provided with posts 504 projecting from its lower (as seen in FIGS. 18 and 23) edge, the posts 504 being arranged in two rows and there being a post 504 for insertion in each of the cavities 16' to make electrical contact with the receptacle portion 502 therein. For improved guidance, the connector abutment plate 354' is mounted on vertical shafts 506 slidably engaged in corresponding bushings 508 secured in the plunger 336'. Also for improved guidance, the cable clamp plates 391' are mounted on vertical shafts 510 slidably engaging in bushings 512 secured in the plungers 336' and 338' (as best seen in FIG. 22). The spring 356' is guided and supported by a short shaft 514 secured to a block 516 screwed to the plate 354' as shown in FIGS. 18 and 21.

Figure 25:
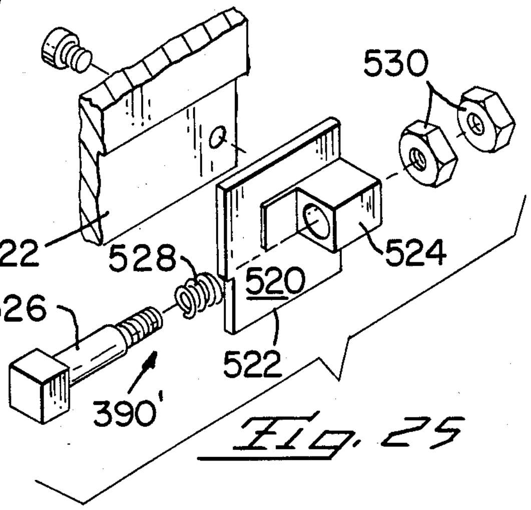

The buffers 390' and 392' are adjustable, stepwise, longitudinally of the nest 94'. The buffer 390' comprises a threaded buffer member 526 received in a sleeve 524 (as best seen in FIG. 25) on a support plate 520 which, as shown in FIG. 21, is severed to one of the plates 391' on the plunger 336' by means of a screw 521 passed through a selected one of holes 554 spaced from one another lengthwise of the plate 391'. The buffer member 526 is surrounded by a spring 528, nuts 530 threaded onto the member 526, serving to secure it in the sleeve 524. The plate 520 and a further plate 522, secured by a screw 523 passed through a selected hole 554 in the opposite plate 391' of the plunger 336', serve to guide the plates 391' of the plungers 336' and 338' relative to one another. The buffer 392' comprises a threaded buffer member 532 slidably received in a sleeve 534 and being secured therein by nuts 536, a spring 538 surrounding the member 532, as will be apparent from FIG. 26. The sleeve 534 has, depending therefrom plates 540 each having two holes 542, spaced from one another lengthwise of the nest 94'. The plates 540 engage, as best seen in FIGS. 21 and 22, in parallel slots 544 formed in the plunger 338'. The sleeve 534 is secured to the plunger 338', by means of a screw 546 engaged in a selected hole 555 of a series of these holes spaced from one another lengthwise of the plunger 338', and in one of the holes 542. The buffer 392' can, therefore, be mounted at various positions spaced from one another longitudinally of the plunger 338'.

Figure 24:
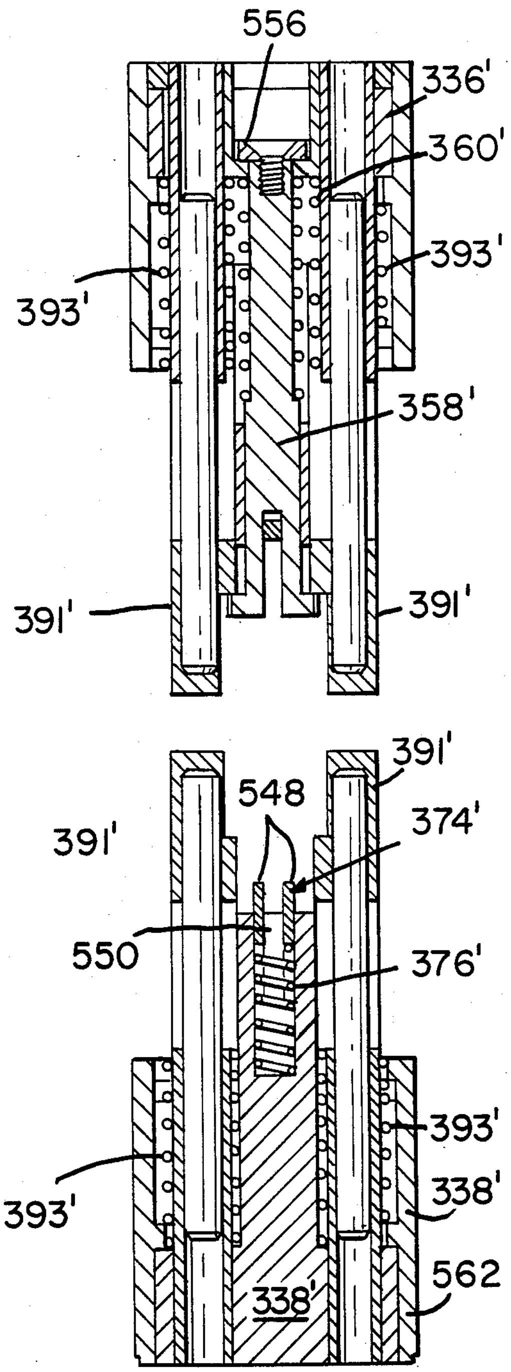
Figure 26:
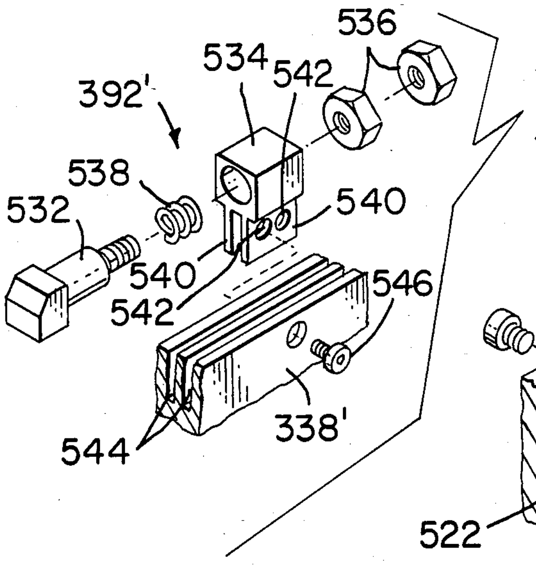
FIGS. 25 and 26 are exploded perspective views of details of the modified nest.

The latch bolt 374' comprises a pair of spaced plates 548 lodged in an elongate recess 550 (as shown in FIG. 24) in the plunger 338' and which are mounted on a pivot pin 552 (FIG. 18) about which the plates 548 can be depressed against the action of the spring 376'.

Figures 19, 20:
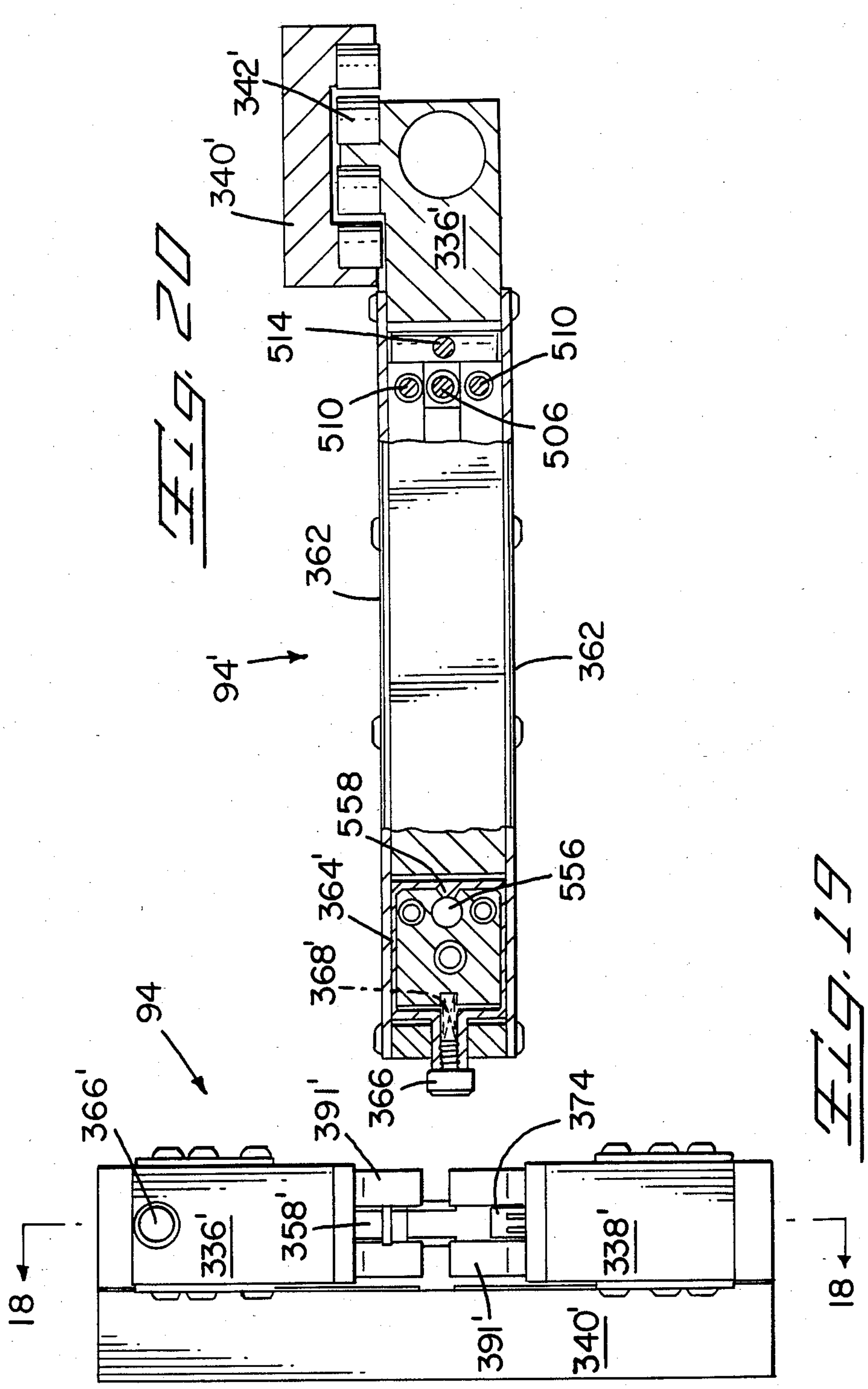
FIG. 19 is an end view of FIG. 18.
FIGS. 20 to 24 are views taken on the lines 20—20, 21—21, 22—22, 23—23 and 24—24, respectively, of FIG. 18.

The latch bolt 358' terminates, at its upper end, as seen in FIGS. 18 and 24, in an enlarged head 556 which is screwed thereto. The latch plate 364' is provided with a nose 558, as shown in FIG. 20, which is engageable beneath the head 556 when the latch bolt 358' has been driven to its raised position when the plungers 336' and 338' have been closed by means of the press 32. The nose 558 is releasable from the head 556 when the nose 366' is engaged by the screw 110 on the ram 66 so that the latch bolt 358' is returned to its lowered position under the action of the spring 360'. The spring 372' is provided with a guide bolt 560 similar to the guide bolt 514.

The plungers 336' and 338' are guided relative to the plates 391' by means of side plates 562 secured thereto.

It has been found that the nest 94' has a greater bearing capacity than the nest 94 and that it operates more smoothly.

Figure 28:
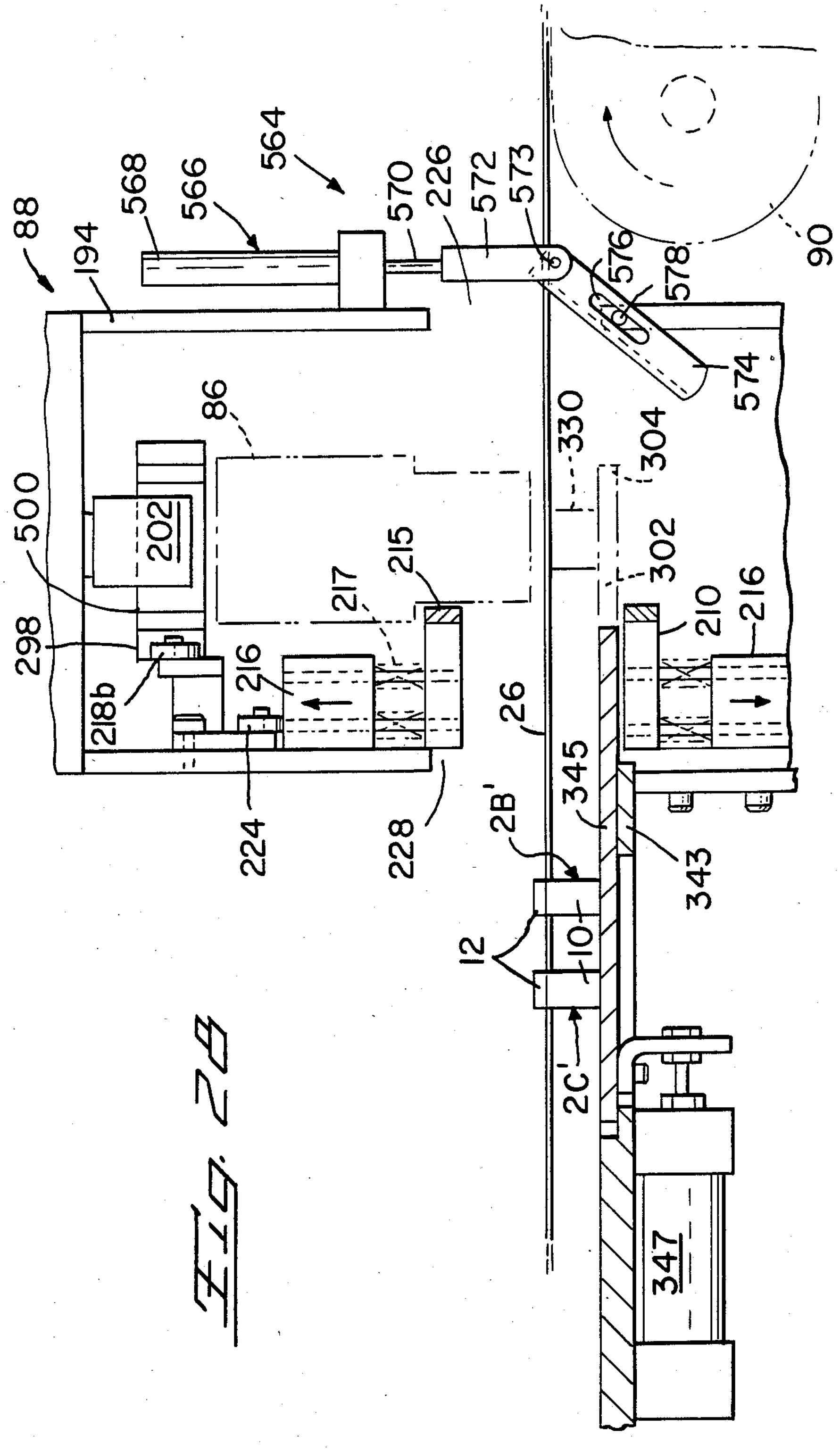
FIG. 28 is a view similar to that of FIG. 15 but illustrating a modification of the cable gripper unit.
Figure 29:
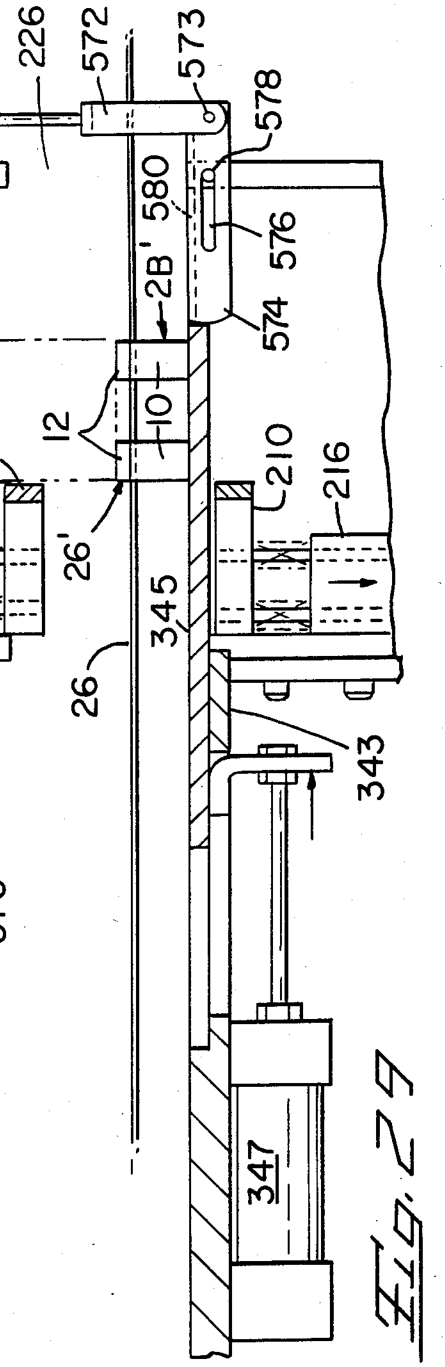
FIG. 29 is a view similar to that of FIG. 16 but illustrating said modification.
Figure 30:
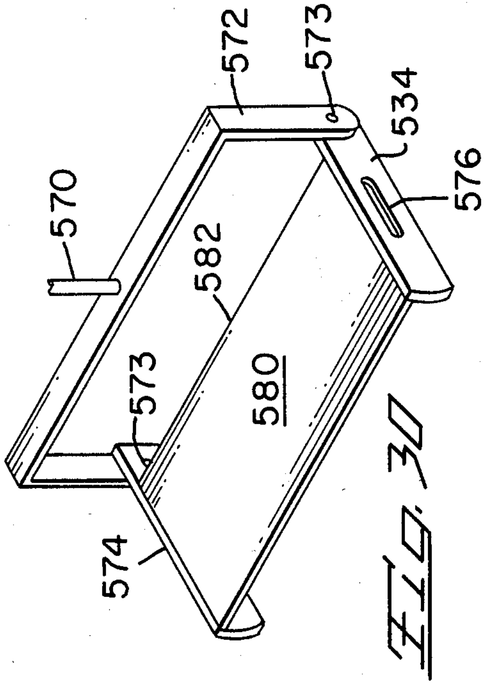
FIG. 30 is a perspective view of a detail of FIGS. 38 and 39.

FIGS. 28 and 30 show a modification of the gripper unit 88 according to which the grippers 212 and 214 and their associated levers 218*a* and 218*b* and drive blocks 216 are omitted, and a cable and connector supporting mechanism 564 is provided on the frame 194. The mechanism 564 comprises a piston and cylinder unit 566, the cylinder 568 of which is fixed to the upper right hand (as seen in FIGS. 28 and 29) part of the frame 194 and to the piston rod 570 of which is connected a yoke 572 to which are pivoted, at 573, arms 574 each having a longitudinal slot 576 slidably receiving a pin 578 on the lower left hand (as seen in FIGS. 29 and 30) part of the frame 194. Fixed between the arms 574 is cable and connector support plate 580, as shown in FIG. 30. In the position of the parts, shown in FIG. 29, the piston rod 570 of the unit 566 is in an advanced position so that rear edge 582 of the plate 580 supports the cable 26 (which extends between the arms of the yoke 572) between the connector 2B' and the conveyor 90, as the cable is fed forward. When the slidable portion 345 of the platform 343 has been advanced, the piston rod 570 is advanced so that plate 580 is swung about the pins 578 so as to be raised and the arms 547 are also slid on the pins 578, towards the portion 345, thereby to move the plate 580 into a connector supporting position in coplanar relationship with the portion 345, to support the connector 2B' as the connector 2A' is carried along by the conveyor 90 when the cable slug 26A has been cut from between the connectors 2B' and 2C' by the unit 86, and to support the connector 2C' as it is subsequently moved towards the conveyor 90 as the cable 26 is fed forward again.

Figure 32:
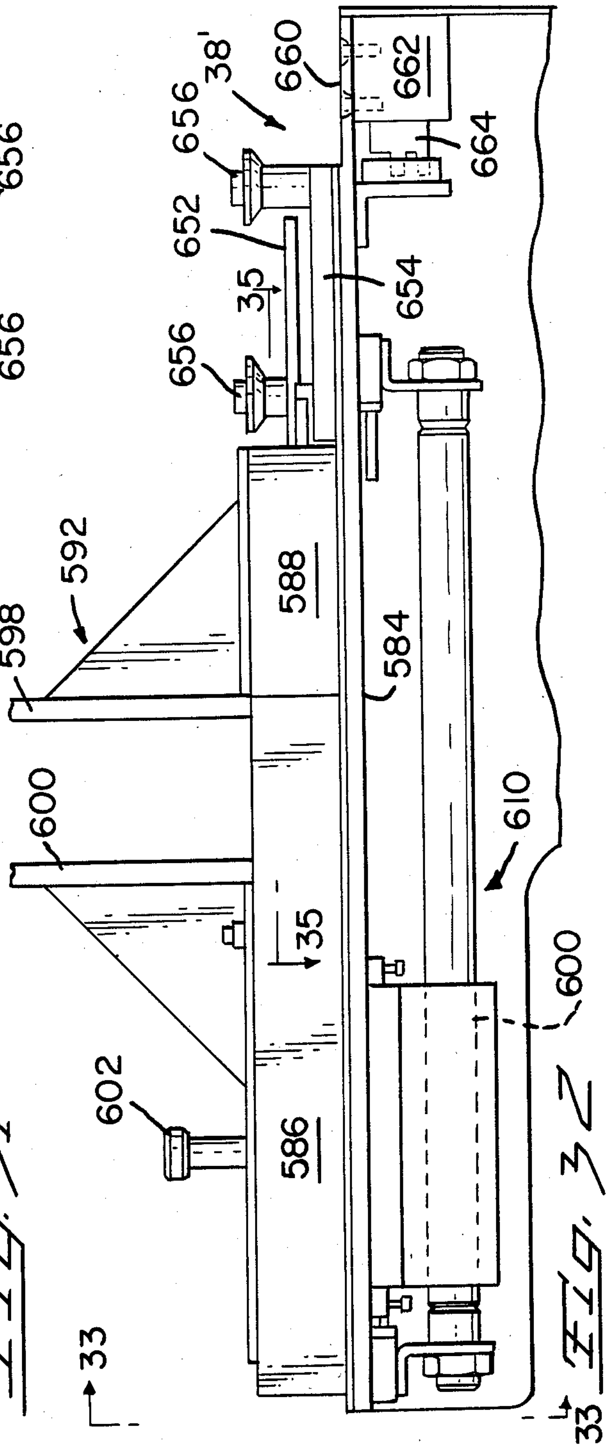
FIG. 32 is a side view of the station of FIG. 31.
Figure 33:
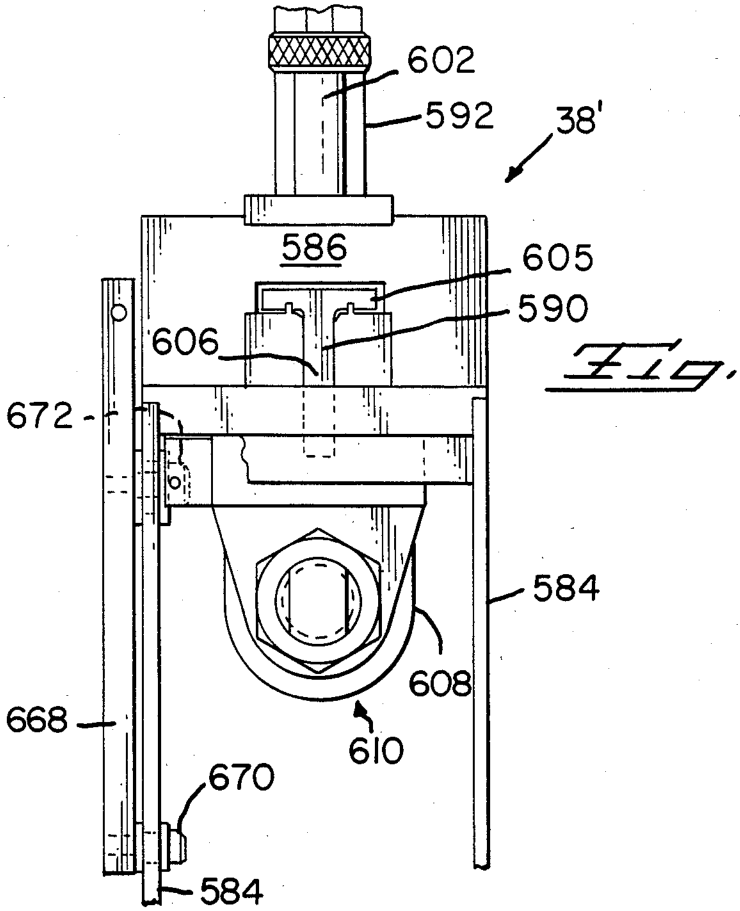
FIG. 33 is a view taken on the lines 33—33 of FIG. 32.
Figure 34:
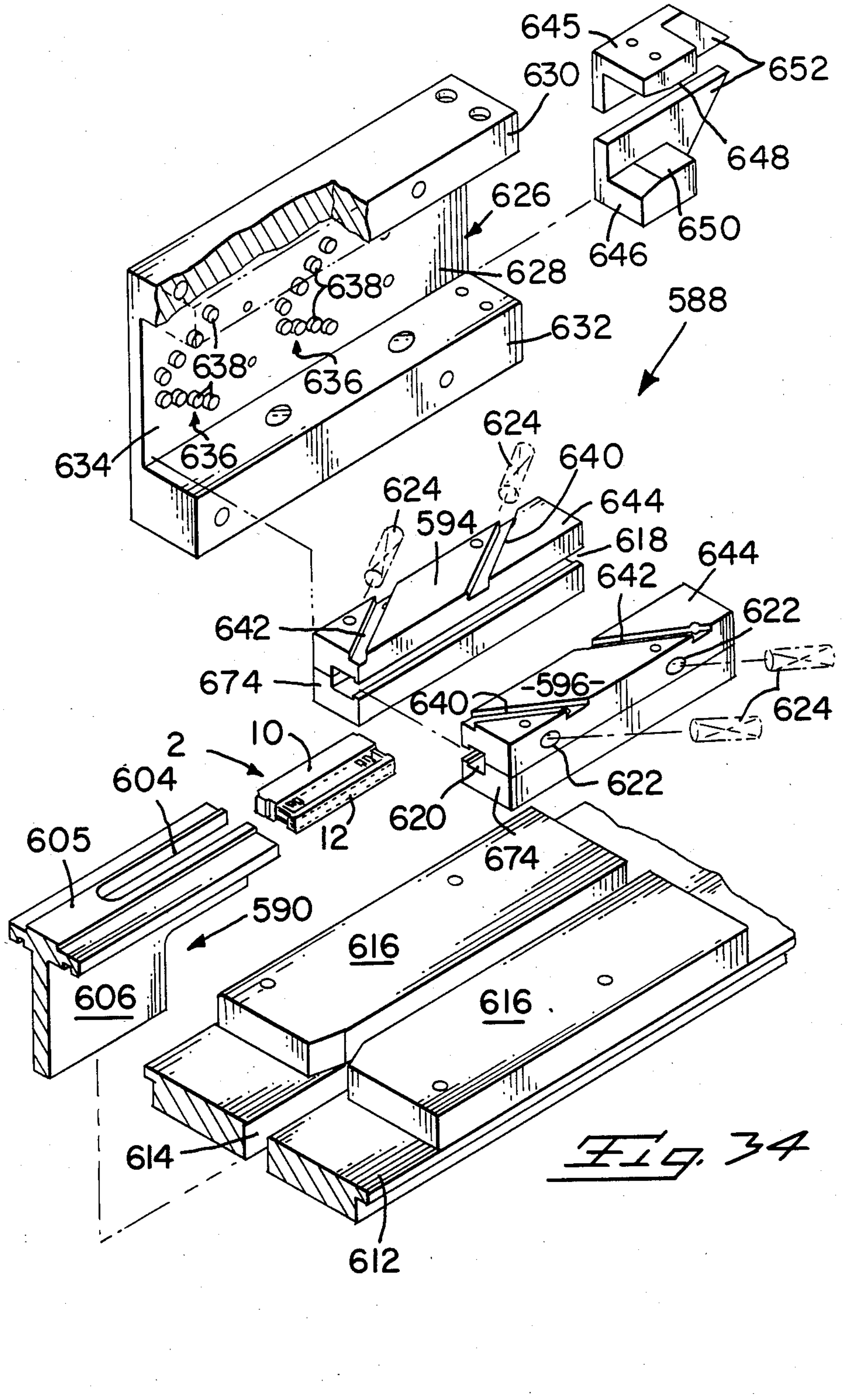
FIG. 34 is an exploded perspective view of a connector separating unit of the pickup station of FIGS. 31 to 33.
Figure 35:
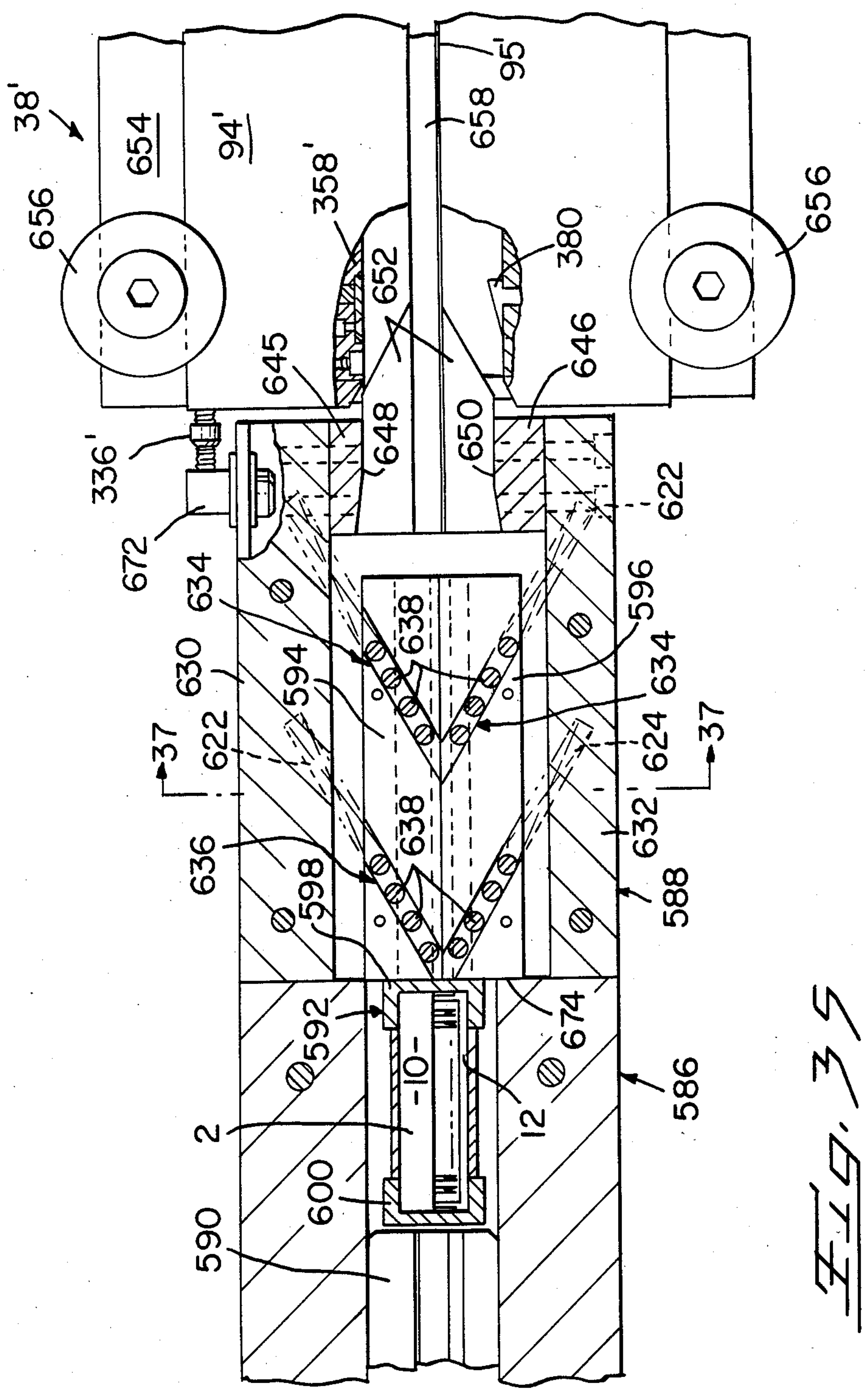
FIG. 35 is a view taken on the lines 35—35 of FIG. 32.
Figure 36:
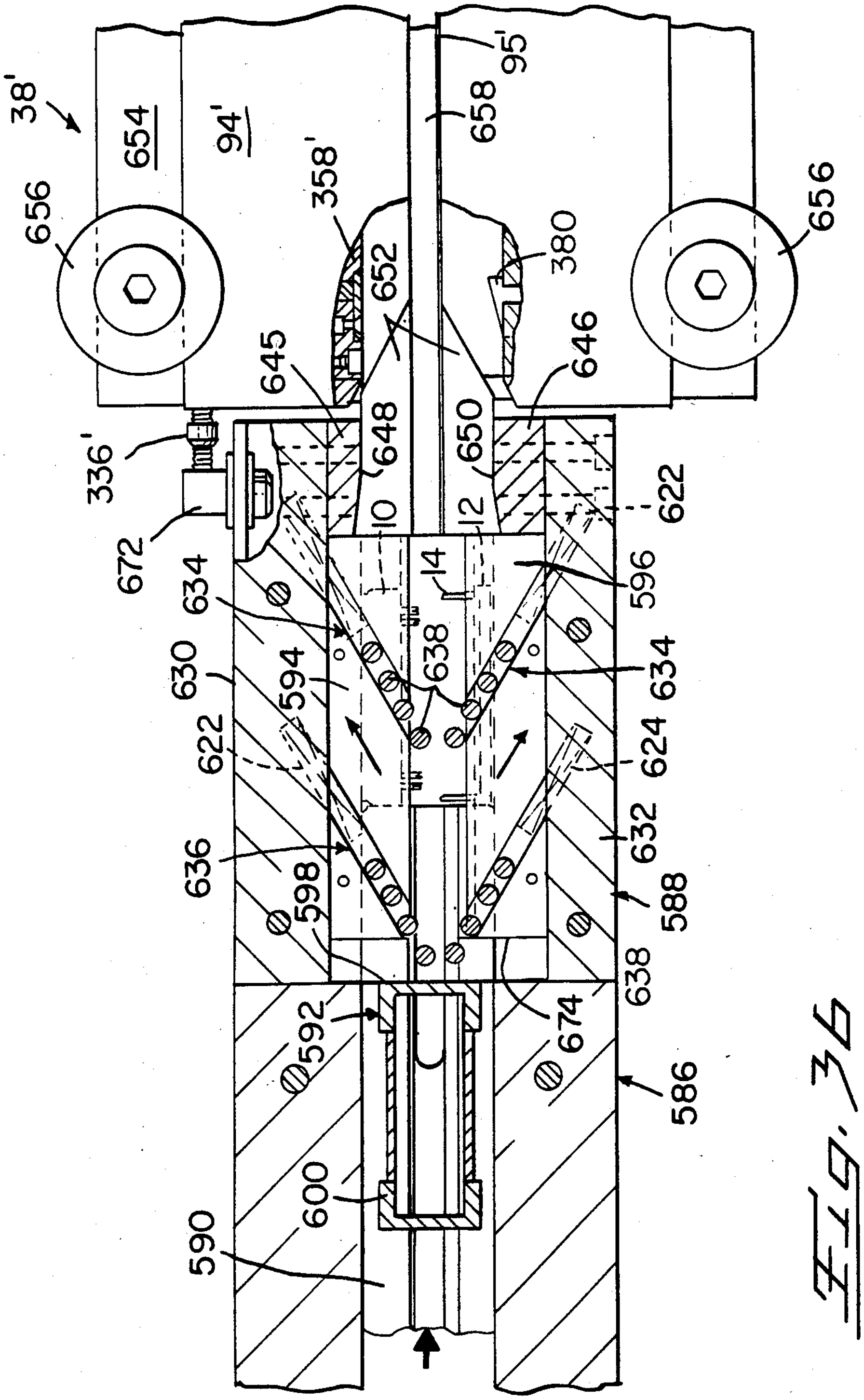
FIG. 36 is a similar view to that of FIG. 35 but showing a subsequent stage in the operating cycle of the connector separating unit.

As shown in FIGS. 31 to 37 the connector pickup station, which is referenced 38', can be modified to feed connectors 2, the covers 12 of which have been partially mated with the bodies 10, as shown in FIGS. 34 to 36, into a connector transfer nest 94 or 94', with the covers 12 separated from the bodies 10.

The pickup station 38' comprises an elongate table 584 on which is mounted a ram housing 586 and a connector separator unit 588. A ram 590 in the housing 586 is drivable from a retracted position in which it is shown in FIG. 35, beneath a magazine 592 to drive a connector body 10 partially mated with its cover 12 into connector separator jaws in the form of slide blocks 594 and 596 of the unit 588 and to cause, as described below, these blocks to diverge from one another so as to separate the cover 12 from the body 10, and then to drive the cover and the body, when so separated, into a nest on the table 584.

The magazine 592 comprises vertical guides 598 and 600, the guide 600 being adjustable for connector length, with respect to the guide 598 by loosening an adjustment screw 602. The magazine 592 may exchangeably support a plastics clip (not shown) containing, for example, fifty connectors 2, the magazine acting as a reservoir of connectors during the exchange of an empty clip for a full one, so that the harness making assembly can continue to operate during the exchange.

The ram 590 is, as best seen in FIGS. 33 and 34, of substantially T-shaped cross-section, the transverse arm 605 thereof being longitudinally divided by a slot 604 opening into the forward end of the ram 590. The vertical arm 606 of the T-section ram 590 is connected to the slide 608 of a rodless piston and cylinder drive unit 610 to the piston of which the slide 608 is magnetically coupled to drive the ram 590 from its FIG. 35 position, beneath the magazine 592, through the separator unit 588, and to return the ram 590 to its starting position.

The unit 588 comprises, as best seen in FIG. 34, a base 612 (mounted on the table 584) having a longitudinal slot 614 for receiving the arm 606 of the ram 590. A separator base cover 616 is fixed to the base 612 on each side of the slot 614, for slidably supporting the respective block 594 or 596. The slide block 594 has a longitudinal through channel 618 for receiving a body 10, the slide block 596 having a longitudinal channel 620 for receiving a cover 12, the channels 618 and 620 opening towards and another. Each block 594 and 596 is formed with a pair of oblique transverse blind bores 622 each for seating one end portion of a return spring 624.

Figure 37:
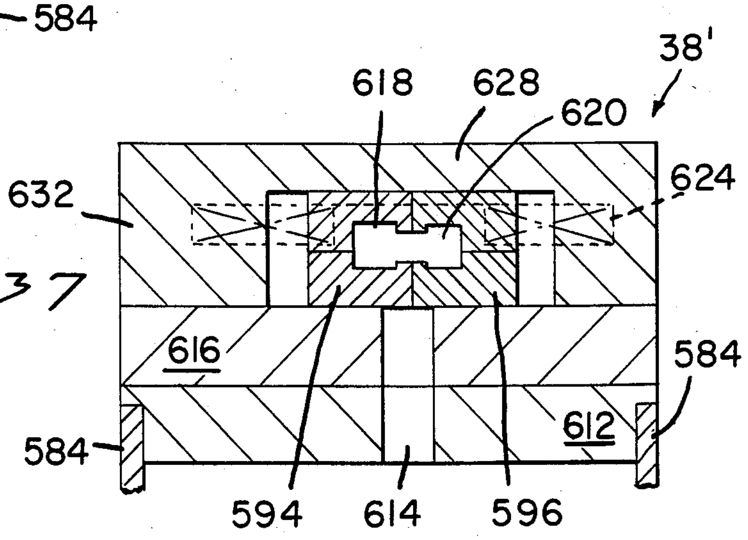
FIG. 37 is a view taken on the lines 37—37 of FIG. 35.

A separator body 626 which is of rectangular, channel shaped cross-section comprises a flat base 628 from which extend, normally thereof, side walls 630 and 632, to define a channel 634 receiving the blocks 594 and 594, the walls 630 and 632 being secured to respective ones of the base covers 616 so that the blocks 594 and 596 are enclosed in the channel 634. Two V-formation arrays 634 and 636 of camming dowels 638 project from the internal face of the base 628 into respective cam follower grooves 640 and 642 in upper faces 644 of the blocks 594 and 596, each block 594 and 596 being thereby slidable along a respective arm of each of the arrays 634 and 636, obliquely towards and away from the respective wall 630 or 632, from the position in which said block is shown in FIGS. 35 and 37 to that in which it is shown in FIG. 36. The travel of the blocks 594 and 596 away from the magazine 592 is limited by L-shaped stop and guide plates 645 and 646 secured to the walls 630 and 632, respectively.

As shown in FIGS. 34 to 36, the plate 645 has a vertical guide surface 648 for a body 10, the plate 646 having a vertical guide surface 650 for a cover 12. Below these guide surfaces, the plates 645 and 646 are each provided with a horizontal guide cheek 652.

At the end of the table 584 remote from the ram housing 586 is a flat seat 654 for a nest 94 or 94' (in this example, a nest 94' is shown). Upstanding from the seat 654 are nest guide rollers 656. A connector guide rib 658, extending axially of the table 584 is disposed centrally of the seat 654 and is supported there above, as shown in FIG. 32. At the end of the seat 654 remote from the unit 588 is a seat portion 660 for the frame 340' of the nest 94'. Beneath the seat portion 660 is a pneumatically operated device 662 for releasing the adaptor 402 from the nest 94' and for engaging the frame 340' when the nest is on the seat 654 and between the guide rolls 656. A microswitch 664 is provided for signalling this occurrence, as well as the removal of the nest from its seat, to the control system.

Figure 31:
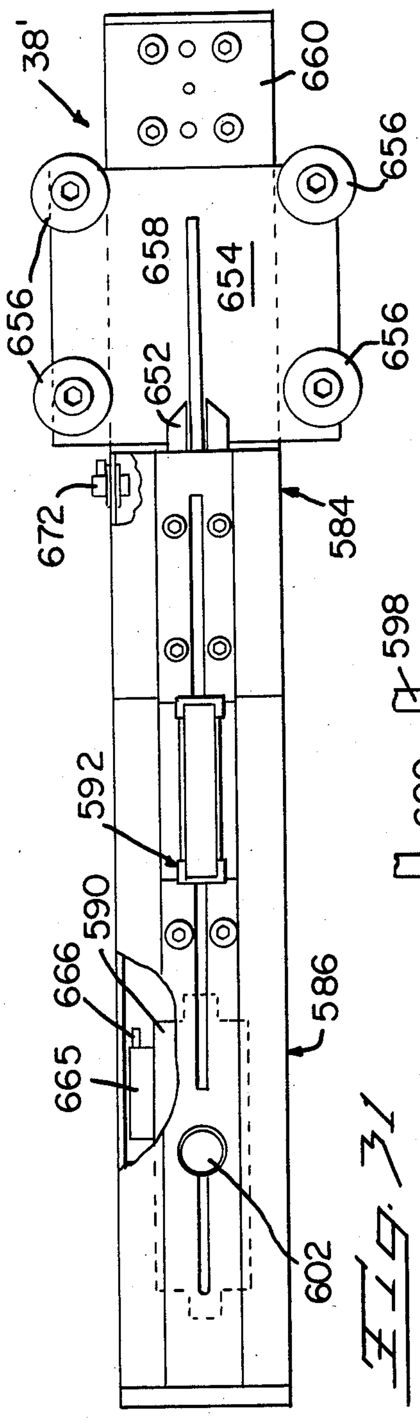
FIG. 31 is a plan view of another form of the connector pickup station.

As shown in FIG. 31, the ram 590 has thereon a block 665 from which a screw 666 projects towards the seat 654. As shown in FIG. 33 a lever 558 is pivoted at 670 at its lower end, to one side of the table 584 and carries at a position towards its other end, an actuator bolt 672 for engaging the nose 366' on the latch plate 364' of the nest 94'. The screw 666 is engageable in the fully advanced position of the ram 590, with the bolt 672 to release the latch plate 364' from the latch bolt 358' of the nest 94'.

When the nest 94' is in place on the seat 654 with the rib 568 received in the slot 95' of the nest 94', the ram 590 is advanced by the unit 610 so that the transverse arm 605 pushes a connected body 10 and cover 12 from beneath the magazine 592 into the respective channels 618 and 620 of the blocks 594 and 596, the arm 605 engages the adjacent end faces 674 of the blocks 594 and 596 so as to cause these blocks to slide, against the action of the springs 624, towards the nest 94' and obliquely away from one another towards the walls 630 and 632, whereby the body 10 in the channel 618 and the cover 12 in the channel 620 are separated from one another. When the blocks 594 and 596 engage the plates 645 and 646, respectively, the former are stopped thereby and are then sufficiently spaced from another to allow the arm 605 of the ram 590 to enter the channels 618 and 620 to drive the body 10 and cover 12 therein, into their correct positions in the nest 94', guided by the surfaces 648 and 650, the cheeks 652 and the guide rib 658. During this movement of the ram 590, the rib 658 is received in the slot 604 in the ram 590. Upon the screw 666 on the ram 590 engaging the actuator bolt 672, the lever 668 is swung towards the nest 94' so that the bolt 672 depresses the nose 366' to release that latch bolt 358' so that the body 10 is latched into the nest 94'. The ram 590 is then retracted so that the blocks 594 and 596 are returned by the springs 624, the device 662 is actuated to release the nest 94' and to secure the adaptor 402 thereto. The nest can then be transported by the robot 34 to the press 42.

We claim:

1. An assembly for connecting to the conductors of a flat multiconductor cable, electrical connectors having electrical terminals provided with cable conductor-receiving portions, the assembly comprising:

a connector pickup station;

a press having platens;

a means for feeding the cable intermittently in a feed direction, between said platens;

a connector transfer nest for releasably retaining an electrical connector therein and for receiving the cable, the nest having means movable by said platens, to insert the conductors of the cable into the conductor-receiving portions of the terminals of the connector, and subsequently to release the connector;

a robot having an arm carrying the transfer nest, the arm being movable to locate the nest at the pickup station and to transfer the nest to a position between said platens;

means at the pickup station for feeding a connector into the nest when the latter has been located at the pickup station; and means for actuating the press to cause the platens to cooperate with said movable means of the nest, to insert the cable conductors into said conductor-receiving portions when the nest is positioned between the platens, and then to release the connector from the nest thereby to allow the nest to be withdrawn from the press by the robot.

2. An assembly as claimed in claim 1, further comprising means on the robot arm for rotating the nest between a plurality of angular positions during its transfer from the pickup station to the press, the press being constructed for receiving the nest between the platens in two opposite directions.

3. An assembly according to claim 1, further comprising a cable severing station arranged downstream of the press in the cable feed direction and having a cable gripping unit and a cable cutting unit movable between a cable cutting position in the cable gripping unit and a position withdrawn therefrom allow the cable with the connector thereon, to be fed through the cable gripping unit.

4. An assembly according to claim 1, further comprising a cable cutting station mounted downstream of the press in the cable feed direction and having a cable gripping unit, a first cable cutting unit adapted to sever a slug of the cable from between two connectors secured to the cable at positions spaced therealong in the same orientation, and a second cable cutting unit for severing a slug of the cable from between two connectors which have been secured thereto at positions spaced therealong in different orientations, each cable cutting unit being movable between a cable severing position in the cable gripping unit and to a position withdrawn therefrom to allow the cable with the connectors thereon to be fed through the cable gripping unit.

5. An assembly as claimed in claim 1, further comprising a device for testing electrical continuity between each terminal of the connector and a corresponding conductor of the cable, the nest comprising a bussing member engageable with the terminals of a connector in the nest when the cable conductors have been inserted into the conductor-receiving portions, the testing device being arranged to scan the conductors of the cable and being connected to the bussing member.

6. An assembly as claimed in claim 1, wherein the nest comprises a plunger connected to a frame and being movable with respect thereto, against the action of resilient return means, to drive the conductor-receiving portions of the terminals of the connector through the cable in cooperation with counterabutment means, and latch means for retaining the connector in the nest, the latch means being movable into a position to release the connector upon the insertion of the conductors into the conductor-receiving portions so that the connector is released for the nest when the plunger is returned by the resilient return means.

7. An assembly as claimed in claim 6, wherein the counterabutment means comprises a second plunger which is movable towards the first-mentioned plunger against the action of the resilient return means, the first-mentioned plunger being adapted to releasably receive a body portion of the connector and the second plunger being adapted to releasably receive a cover portion of the connector having means for latching it to the body portion, the nest defining a slot for receiving the cable, the slot extending between the plungers.

8. An assembly as claimed in claim 1, wherein the nest is connected to the arm of the robot by means of an adaptor secured to the nest and releasably receiving a central spigot projecting from a rotary disk on the arm and a pin positioned eccentrically on the disk, release means provided in the adaptor being depressible to release the spigot therefrom.

9. An assembly as claimed in claim 8, wherein the connector pickup station comprises a platform for supporting the nest, the platform having thereon a member for engagement with the nest to retain it on the platform and a member for depressing the release means of the adaptor, said members being simultaneously actuable to retain the nest on the platform to release the spigot from the adaptor, and to release the nest from the platform and to retain the spigot in the adaptor.

10. An assembly as claimed in claim 1, wherein the cable feed mechanism comprises a plurality of idle feed rolls, an endless belt of flexible but inextensible material extending thereabout, and a driven roll positioned to engage the cable with the belt at a position between the idle rolls.

11. An assembly as claimed in claim 10, wherein the idle rolls are three in number, and comprise two smaller idle rolls positioned on either side of a larger idle roll, the idle rolls being supported by a frame which is movable with respect to the driven roll, the driven roll being positioned between the larger idle roll and one of the smaller idle rolls, and a further idle roll being positioned to engage the cable with the belt, at a position between the larger idle roll and the other smaller idle roll, means being provided to urge the frame towards the driven roll and the further idle roll.

12. Apparatus as claimed in claim 1, wherein the pickup station comprises a connector magazine, a drive unit on one side of the magazine, a nest support platform on the opposite side of the magazine, a ram which is movable by means of the drive unit from a retracted position through the drive unit and towards the nest supporting platform, and a means for guiding a connector driven by the ram, into the nest.

13. An assembly as claimed in claim 12, wherein the ram has a projection for actuating a latch release member on the nest, when such is positioned on said platform to release a latch in the nest, so as to latch into the nest, a connector inserted thereinto by means of the ram.

14. An assembly as claimed in claim 13, wherein the magazine contains a stack of connector bodies and a stack of connector covers which are latchingly engageable with the connector bodies, a first arm of the ram being positioned, when the ram is driven towards said platform by means of the drive unit, to insert a connector body into the nest and a second arm of the ram being positioned simultaneously to insert a connector cover into the nest, a separator bar between said arms extending between the body and the cover.

15. An assembly as claimed in claim 1, wherein the press comprises a plurality of columns, bearings slidably supporting the columns, a first platen supporting plate secured to the distal ends of the columns, a second platen supporting plate mounted to slide along the columns, between the bearings of said first plate, one platen being supported on the first plate and the other on the second plate, a toggle linkage connected to the second plate and to the columns, and a drive unit adapted to act upon the toggle mechanism so as to drive the platen supporting plates towards and away from one another.

16. An assembly as claimed in claim 6, wherein the plunger is connected to the frame by means of cross roller bearings, and is slidable with respect thereto on rods slidably engaging in bushings in the plunger, the nest being provided with spring-loaded cable gripping plates mounted on rods engaging in bushings in the plunger and in the counterabutment.

17. An assembly for the production of electrical harnesses each comprising electrical connectors mechanically and electrically connected to lengths of flat cable, the assembly comprising:

a connector pickup station;

a press mounted at a position spaced from the pickup station;

a cable supply source positioned on one side of the press;

a cable cutting and gripping station positioned on the opposite side of the press, and having an open cable receiving position and a closed cable gripping and cable cutting position;

a cable feed mechanism adapted to intermittently drive cable from the source through the press and through the cable cutting and gripping station in said open position thereof;

a connector transfer nest for releasably receiving an electrical connector provided with terminals having conductor-receiving portions projecting from a face of the connector, and for receiving the cable at a position adjacent to said face;

means at the pick-up station for inserting an electrical connector into the nest;

a robot having an arm carrying said nest and being adapted to position the nest at the pick-up station to receive a connector therefrom, to transfer the nest from the pick-up station to the press and subsequently to withdraw the nest from the press;

means for actuating the press when the nest is positioned therein, to insert the conductors of the cable into the conductor-receiving portions of the connector, and for further actuating the press to release the connector from the nest to permit the nest; and means for actuating the gripping and cutting station to grip the cable fed therethrough by the cable feed mechanism and to sever the cable to produce electrical harnesses.

18. An assembly as claimed in claim 17, wherein the gripping and cutting station is provided with means for gripping a pair of spaced connectors therein and with blades for severing the length of cable extending between the connectors against facing sides thereof and for gripping the cable on each side of the connectors and therebetween.

19. An assembly as claimed in claim 17, wherein a plurality of connector pickup stations are provided and a plurality of nests each supported at a pickup station, the arm of the robot being attachable to, and detachable from, each nest in turn.

20. An assembly as claimed in claim 17, wherein a conveyor is provided on the side of the cable cutting and gripping station, remote from the press, the conveyor having at its end remote from the cable gripping and cutting station, a flip chute and means being provided for detecting discontinuity between a cable conductor and a terminal to which it has been connected, and for actuating the flip chute to discard a harness fed thereinto by the conveyor and in respect of which a discontinuity has been detected.

* * * * *